(12) United States Patent
Endo et al.

(10) Patent No.: US 6,950,120 B1
(45) Date of Patent: Sep. 27, 2005

(54) CAMERA LAYOUT FOR ACQUIRING IMAGES USED IN PANORAMIC SYNTHESIS

(75) Inventors: Takaaki Endo, Yokohama (JP); Akihiro Katayama, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/098,544

(22) Filed: Jun. 17, 1998

(30) Foreign Application Priority Data

Dec. 3, 1997 (JP) .................................. 9-333287

(51) Int. Cl.$^7$ ............................................. H04N 7/18
(52) U.S. Cl. ...................................................... 348/36
(58) Field of Search ............................ 348/36, 39, 42, 348/143, 148–153, 159, 211; 353/10; 359/202; 382/104, 154; 396/166; H04N 7/18; 355/46

(56) References Cited

U.S. PATENT DOCUMENTS

| | | | | |
|---|---|---|---|---|
| 3,883,237 A | * | 5/1975 | Juergens ...................... | 353/10 |
| 4,653,104 A | * | 3/1987 | Tamura ....................... | 382/154 |
| 4,994,971 A | | 2/1991 | Poelstra | |
| 5,073,824 A | * | 12/1991 | Vertin ......................... | 348/211 |
| 5,200,818 A | * | 4/1993 | Neta et al. ................... | 348/36 |
| 5,517,419 A | | 5/1996 | Lanckton et al. | |
| 5,617,175 A | * | 4/1997 | Asakura et al. ............. | 396/166 |
| 5,633,946 A | * | 5/1997 | Lachinski et al. .......... | 348/153 |
| 5,650,813 A | * | 7/1997 | Gilblom et al. ............. | 348/36 |
| 5,672,820 A | | 9/1997 | Rossi et al. | |
| 5,767,945 A | * | 6/1998 | Fields et al. ................. | 355/46 |
| 5,805,275 A | * | 9/1998 | Taylor ......................... | 359/202 |
| 6,064,355 A | * | 5/2000 | Donahue et al. ............ | 348/39 |
| 6,075,559 A | | 6/2000 | Harada | |
| 6,133,947 A | | 10/2000 | Mikuni | |
| 6,236,748 B1 | * | 5/2001 | Iijima et al. ................. | 382/154 |
| 6,335,754 B1 | | 1/2002 | Endo et al. | |

FOREIGN PATENT DOCUMENTS

| | | |
|---|---|---|
| WO | WO95/32483 | 11/1995 |

OTHER PUBLICATIONS

"Onboard Image Capturing System and Interpolation Technique for Largescale Photorealistic 3-D Virtual World", M. Hirose, et al., The Institute of Electronics, Information and Communication Engineers, IEIECE, MVE97-26, pp. 39-44, Jun. 1997.

"Building Image-Based Cybercities by Using Vehicle-Mounted Cameras", T. Endo, et al., 1997 IEICE Fundamental Boundary Society Conference, pp. 276-277.

"Building Image-Based Cybercities by Using Vehicle-Mounted Cameras (1)-Consideration on Cameras and 3D Sensors", T. Endo et al., Proceedings of the Second VRSJ Annual Conference, pp. 63-66, Sep. 1997.

(Continued)

*Primary Examiner*—Richard Lee
(74) *Attorney, Agent, or Firm*—Fitzpatrick, Cella, Harper & Scinto

(57) ABSTRACT

An image recording apparatus for recording images sensed by at least two cameras attached to a vehicle, has a first camera which is arranged to have an image sensing direction agreeing with a first direction of a vehicle, a second camera which is arranged at a position separated a known distance r from the first camera to have an image sensing direction agreeing with a second direction about 180° different from the first direction, and a unit for, when the vehicle travels in the first direction, recording first image data sensed by the first camera and second image data sensed by the second camera a time duration later corresponding to the known distance, in association with each other.

3 Claims, 25 Drawing Sheets

OTHER PUBLICATIONS

Building Image-Based Cybercities by Using Vehicle-Mounted Cameras (2) - Generation of Wide-Range Virtual Environment by Using Photorealistic Images- Hirose, et al., Proceedings of The Second VRSJ Annual Conference, Sep. 18, 1997 - Sept. 19, 1997, pp. 67-70 and English Translation.

* cited by examiner

CAMERA LAYOUT FOR ACQUIRING IMAGES USED IN PANORAMIC SYNTHESIS

BACKGROUND OF THE INVENTION

The present invention relates to an image recording method and apparatus for describing a virtual space on the basis of sensed images and, more particularly, to a method and apparatus for processing sensed images from a plurality of cameras which are separated from each other as if they were obtained from cameras which are not separated from each other. The present invention also relates to a recording medium that stores a program for implementing the method.

In recent years, attempts have been made to build civic environments where many people socially live in cyber spaces formed by computer networks. Normally such virtual spaces are described and displayed using conventional CG techniques. However, since CG expressions based on geographic models have limitations, Image-Based Rendering (IBR) based on sensed images has come to the forefront of the technology.

Reproducing sensed image data as they are amounts to merely experiencing what a photographer has gone through. For this reason, a technique for generating and presenting an arbitrary scene in real time using the IBR technique has been proposed. More specifically, when sensed images are processed as independent ones, and are re-arranged in accordance with a viewer's request, the viewer can walk through his or her desired moving route at a remote place, and can feel a three-dimensional virtual space there.

It is effective for searching for and re-constructing a desired image in accordance with the viewer's request to use the location information of points where the individual images were taken. That is, an image closest to the viewer's request is selected from a database, and undergoes proper image interpolation so as to generate and display an optimal image.

FIG. 1 shows the principle of wide-area walkthrough using sensed images.

More specifically, sensed images are prepared for narrow areas 1, 2, 3, and 4. In order to implement wide-area walkthrough (e.g., along a route 10 or 11) that allows the viewer to walk across these narrow areas, an image in a space between adjacent narrow areas must be obtained by interpolation. When the viewer is currently located at a position between the narrow areas 2 and 3, and the space between these areas is obtained by interpolation, specific sensed images for the areas 2 and 3 must be obtained by a search on the basis of information associated with the current location of the viewer between the areas 2 and 3. In other words, in order to obtain required images by a search on the basis of the location information of the user, a database of sensed images must be prepared in advance in accordance with location data upon image sensing.

In order to attain precise interpolation and to smoothly connect the interpolated images and sensed images, as the viewer may walk through in the 360° range around him or her, sensed images of the environment must be taken by a large number of cameras disposed to point in various directions, and an image database must be built using these sensed images.

In order to attain precise interpolation on the basis of images obtained using a plurality of cameras, the image sensing centers of many cameras must agree with each other. However, it is not easy to arrange many cameras in such way.

To solve this problem, conventionally, a plurality of mirrors are set symmetrically about a given point, and the mirror surfaces of the individual mirrors are set so that light beams coming from the surrounding portions are reflected upward, thereby setting the image sensing centers of the cameras at one point, as shown in FIG. 2.

However, in the mirror layout shown in FIG. 2 it is difficult to prevent the photographer (vehicle) from being reflected in the mirrors.

SUMMARY OF THE INVENTION

The present invention has been made in consideration of the above situation, and has as its object to provide an image database forming method for processing sensed images from a plurality of cameras which are separated from each other as if they were obtained from cameras which are not separated from each other. With the database, a high degree of freedom in camera layout can be assured.

It is another object of the present invention to provide an image recording apparatus which can assure a high degree of freedom in camera layout by setting a camera which senses a front image to be separated from a camera which senses an image in the direction opposite to the front image while setting cameras on the right and left sides of a vehicle to be close to each other, since the vehicle that mounts cameras for obtaining sensed images travels straight most of the time.

In order to achieve the above objects, according to the present invention, an image recording apparatus for recording images sensed by at least two image sensing means attached to a vehicle, is characterized by comprising:

first image sensing means which is arranged to have an image sensing direction agreeing with a first direction of the vehicle;

second image sensing means which is arranged at a position separated a known distance from the first image sensing means to have an image sensing direction agreeing with a second direction substantially 180° different from the first direction; and recording means for, when the vehicle travels in the first direction, recording first image data sensed by the first image sensing means and second image data sensed by the second image sensing means, a time-duration later corresponding to the known distance, in association with each other.

According to a preferred aspect of the present invention, the first image sensing means comprises a plurality of cameras, image sensing directions of which are deployed symmetrically about the first direction.

According to a preferred aspect of the present invention, straight lines on the image sensing directions of the plurality of cameras cross each other in front of the plurality of cameras.

According to a preferred aspect of the present invention, the apparatus further comprises:

third image sensing means which is arranged at a position near the first image sensing means to have an image sensing direction agreeing with a third direction different from the first direction; and fourth image sensing means which is arranged at a position symmetrical to the third direction about a straight line pointing in the first direction.

According to a preferred aspect of the present invention, the second image sensing means comprises a plurality of cameras, image sensing directions of which point in at least two directions symmetrical about the second direction.

In order to achieve the above objects, according to the present invention, an image recording apparatus for recording images sensed by at least two image sensing means attached to a vehicle, is characterized by comprising:

first image sensing means which is arranged to have an image sensing direction agreeing with a first direction of the vehicle;

a plurality of cameras which are arranged at positions separated a known distance from the first image sensing means to have image sensing directions agreeing with a plurality of directions symmetrical about a second direction substantially 180° different from the first direction;

means for detecting a turn of the vehicle;

selection means for selecting the camera which points at a larger angle in a counterclockwise or clockwise direction from the plurality of cameras depending on whether the vehicle has turned clockwise or counterclockwise from the first direction; and recording means for recording first image data sensed by the first image sensing means and second image data sensed by the camera selected by the selection means at a timing a duration corresponding to the known distance later, in association with each other.

According to a preferred aspect of the present invention, the plurality of cameras have two cameras, and the image sensing directions of the cameras cross each other on an extending line of the second direction.

According to a preferred aspect of the present invention, the plurality of cameras have first to third cameras, the first camera has an image sensing direction agreeing with the second direction, and image sensing directions of the second and third cameras are respectively turned clockwise and counterclockwise to be deployed symmetrically about the second direction, and the selection means selects the first camera when the vehicle travels in the first direction, the second camera when the vehicle turns counterclockwise, and the third camera when the vehicle turns clockwise.

According to a preferred aspect of the present invention, the apparatus further comprises:

third image sensing means which is arranged at a position near the first image sensing means to have an image sensing direction agreeing with a third direction different from the first direction; and fourth image sensing means which is arranged at a position symmetrical to the third direction about a straight line pointing in the first direction.

In order to achieve the above objects, according to the present invention, an image database apparatus for generating a database used for building a three-dimensional image space from image sequences sensed by a plurality of image sensing means attached to a vehicle after acquisition of image data, comprises:

a first reader for reading data from a first image data memory recorded by first image sensing means pointed in a first direction;

a second reader for reading data from a second image memory recorded by second image sensing means which is arranged at a position separated a known distance from the first image sensing means to point in a second direction substantially 180° different from the first direction;

a third reader for reading data from a third memory which records a moving position and traveling direction of the vehicle; and means for associating image data read by the first reader, and image data at a position the known distance later of those read by the second reader with each other when traveling direction data read by the third reader indicates that the vehicle is traveling substantially straight.

According to a preferred aspect of the present invention, when the image sensing means includes two cameras having different directions, the associating means associates image data read by the first reader and image data at a position the known distance later of those read by the second reader from the camera located at a counterclockwise or clockwise position with each other, when the traveling direction data read by the third reader indicates a clockwise or counterclockwise turn.

In order to achieve the above objects, according to the present invention, an image recording method of recording images sensed by at least two image sensing means attached to a vehicle, is characterized by comprising the steps of:

arranging first image sensing means to have an image sensing direction agreeing with a first direction of the vehicle;

arranging second image sensing means at a position separated a known distance from the first image sensing means to have an image sensing direction agreeing with a second direction substantially 180° different from the first direction; and recording, when the vehicle travels in the first direction, first image data sensed by the first image sensing means and second image data sensed by the second image sensing means at a timing a duration corresponding to the known distance later, in association with each other.

According to a preferred aspect of the present invention, the first image sensing means comprises a plurality of cameras, image sensing directions of which are deployed symmetrically about the first direction.

According to a preferred aspect of the present invention, straight lines on the image sensing directions of the plurality of cameras cross each other in front of the plurality of cameras.

According to a preferred aspect of the present invention, the method further comprises the steps of:

arranging third image sensing means at a position near the first image sensing means to have an image sensing direction agreeing with a third direction different from the first direction; and arranging fourth image sensing means at a position symmetrical to the third direction about a straight line pointing in the first direction.

According to a preferred aspect of the present invention, the second image sensing means comprises a plurality of cameras, image sensing directions of which point in at least two directions symmetrical about the second direction.

In order to achieve the above objects, according to the present invention, an image recording method of recording images sensed by at least two image sensing means attached to a vehicle, is characterized by comprising the steps of:

arranging first image sensing means to have an image sensing direction agreeing with a first direction of the vehicle;

arranging a plurality of cameras at positions separated a known distance from the first image sensing means to have image sensing directions agreeing with a plurality of directions symmetrical about a second direction substantially 180° different from the first direction;

detecting a turn of the vehicle;

selecting the camera which points at a larger angle in a counterclockwise or clockwise direction from the plurality of cameras depending on whether the vehicle has turned clockwise or counterclockwise from the first direction; and recording first image data sensed by the first image sensing means and second image data sensed by the selected camera at a timing a duration corresponding to the known distance later in association with each other.

According to a preferred aspect of the present invention, the plurality of cameras have two cameras, and the image sensing directions of the cameras cross each other on an extending line of the second direction.

According to a preferred aspect of the present invention, the plurality of cameras have first to third cameras, the first camera has an image sensing direction agreeing with the second direction, and image sensing directions of the second and third cameras are respectively turned clockwise and counterclockwise to be deployed symmetrically about the second direction, and the selection step includes the step of selecting the first camera when the vehicle travels in the first direction, the second camera when the vehicle turns counterclockwise, and the third camera when the vehicle turns clockwise.

Other features and advantages of the present invention will be apparent from the following description taken in conjunction with the accompanying drawings, in which like reference characters designate the same or similar parts throughout the figures thereof.

DETAILED DESCRIPTION OF THE INVENTION

A preferred embodiment to which the present invention is applied will be described hereinafter. This embodiment is directed to a system for acquiring sensed images (to be referred to as an "image acquisition system" hereinafter), and a system for building an image database to implement wide-area walkthrough from images acquired by the acquisition system (to be referred to as an "image database generation system" hereinafter).

According to the present invention, location information upon image sensing can be added to image data in real time. Therefore, according to the present invention, in principle an image database can be generated in real time upon image acquisition. However, the data volume of sensed images is huge, and database generation requires data edit. Hence, parallel processing of image acquisition and database generation is not always required. For this reason, the system of this embodiment is divided into two systems, i.e., the "image acquisition system" and "image database generation system".

<Arrangement of Image Acquisition System>

The image acquisition system of this embodiment senses images of a surrounding environment using a plurality of cameras mounted on a vehicle. Also, on the vehicle, a GPS sensor 40 for detecting the vehicle location, a posture sensor 41 for detecting the posture of the vehicle body (i.e., camera posture), and an azimuth sensor 42 for geomagnetically detecting the azimuth are mounted.

Figure 1:
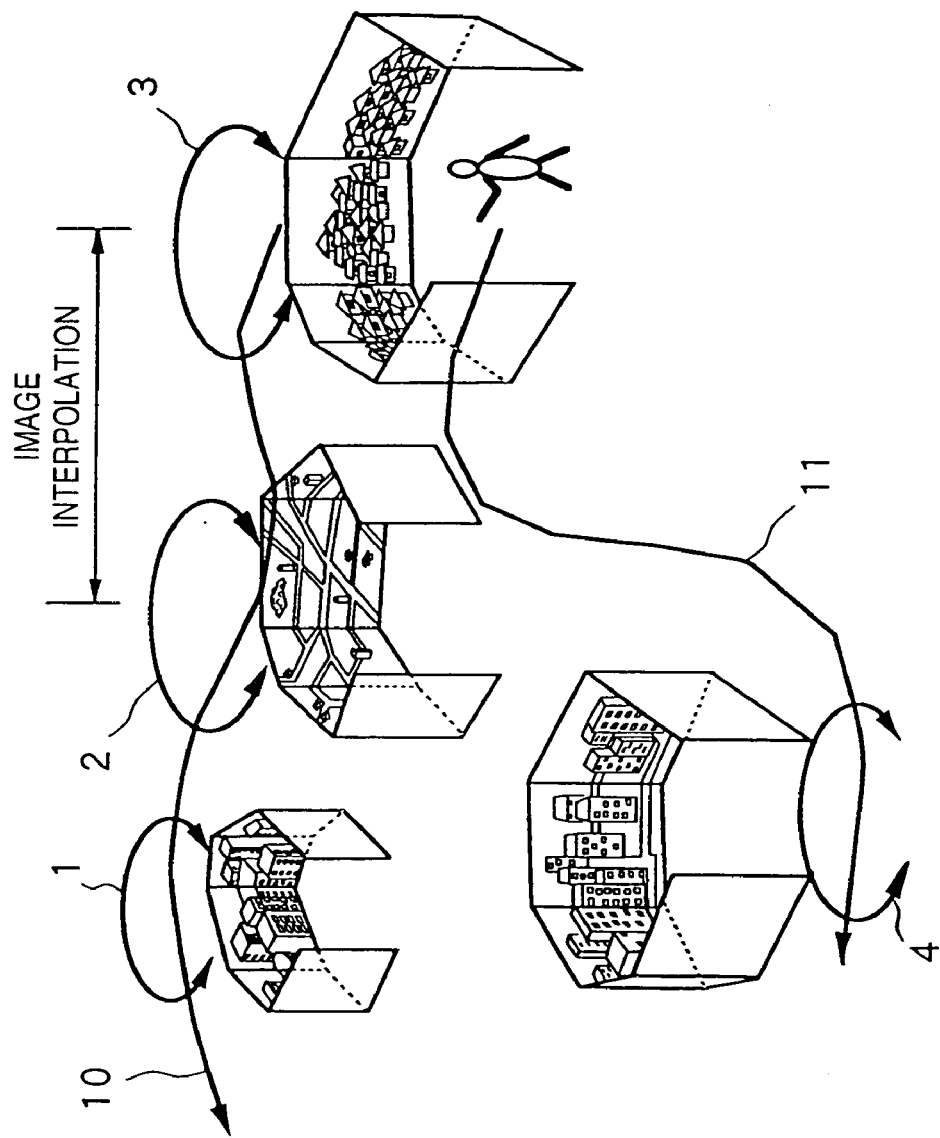
FIG. 1 is an explanatory view of the principle of wide-area walkthrough to which the present invention can be applied.
Figure 2:
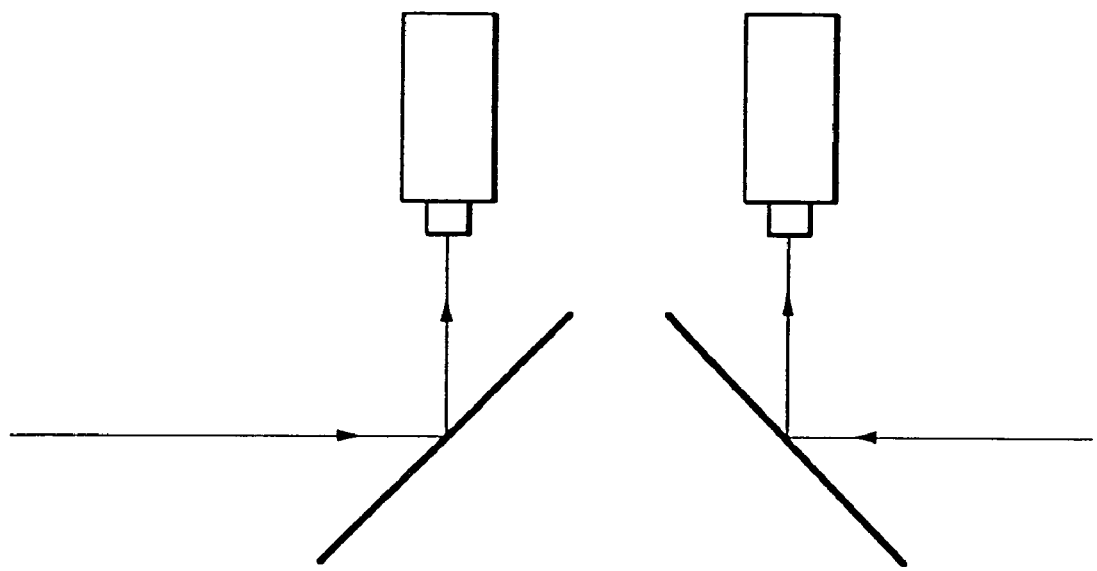
FIG. 2 is a side view showing the schematic arrangement of a camera mounting device arranged in a conventional camera layout apparatus.
Figure 3:
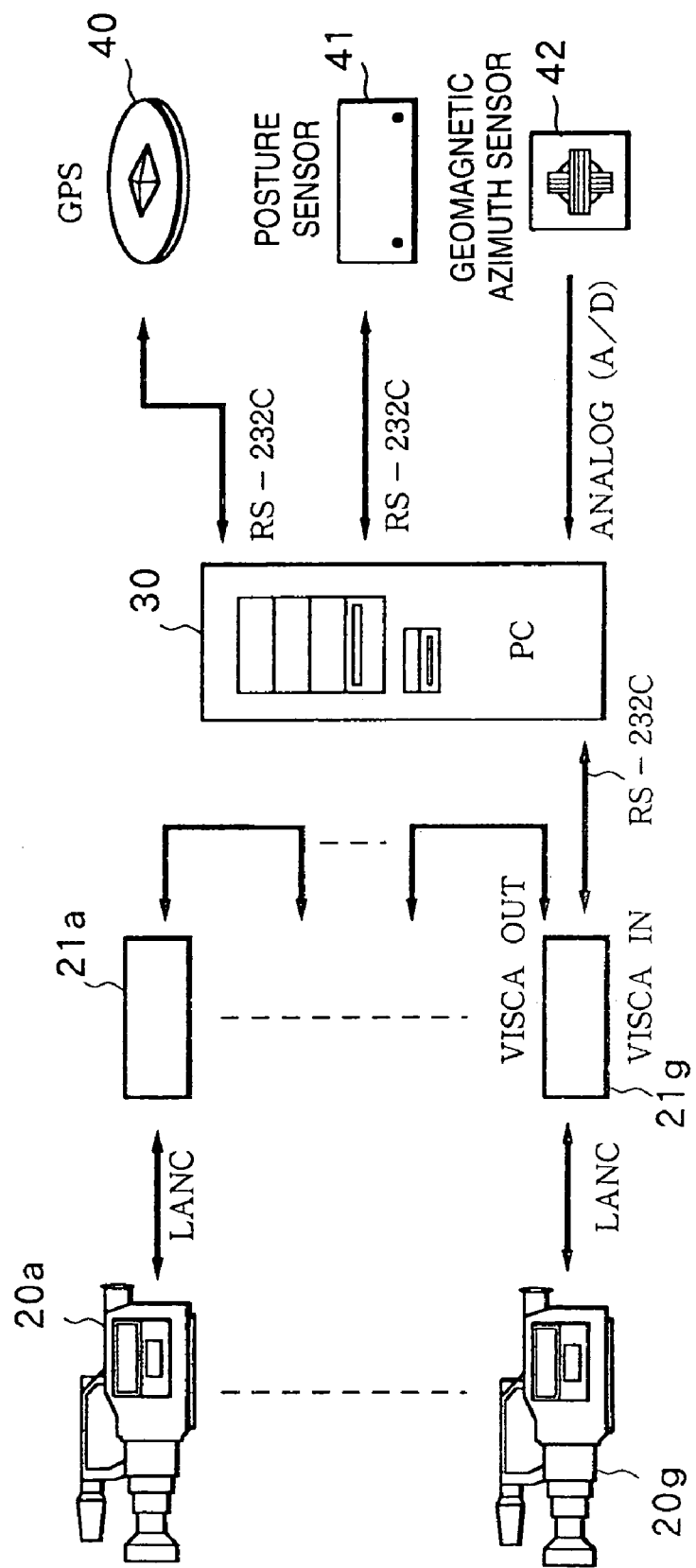
FIG. 3 is a block diagram showing the arrangement of a data acquisition system according to an embodiment of the present invention.

FIG. 3 shows the arrangement of the image acquisition system. The image acquisition system is built by mounting the respective devices shown in FIG. 3 on a vehicle.

Seven cameras (20a, 20b, ..., 20g) for sensing environment images are mounted. Each camera used, for example, a video camera DCR-VX1000 available from Sony Corp.

A PC 30 controls the entire image acquisition system, and incorporates a microprocessor Pentium Pro 200 MHz. The PC 30 and the individual cameras 20 are connected via video/computer interface units 21a, ..., 21g (Vbbx II CI-1100 available from Sony Corp.).

The PC 30 and the interface unit 21g are connected via a known RS232C interface bus, and the interface units 21a, 21b, ..., 21g are connected by daisy chain (input signal: VISCA IN, output signal: VISCA OUT). As will be described later, the PC 30 sends a time code inquiry signal to the individual cameras 20a, ..., 20g. In response to the inquiry signal, the cameras 20a, ..., 20g output time code information onto a signal line VISCA OUT, and the time code information is supplied to the PC 30.

Note that the time code is time information written on a magnetic tape that travels at a prescribed speed in the video camera at predetermined time intervals, and detection of one time code signal upon reproduction of the magnetic tape means an elapse of the predetermined time. That is, based on the number of detected time code signals, the time required for reproduction from the beginning of the magnetic tape to the current position can be detected.

A GPS sensor 40 and a three-axis posture sensor 41 are connected to the PC 30 via RS232C interface buses, and a geomagnetic azimuth sensor 42 is connected to the PC via an analog bus. An azimuth signal from the sensor 42 is A/D-converted by an internal A/D converter board (not shown) inserted in the PC 30.

The GPS sensor 40 used in this system used Model 4400 as a kinematic sensor available from Trimble Navigation Limited. The kinematic sensor is capable of location measurements with precision of ±3 cm at a sampling rate of 5 Hz.

The posture sensor 41 used GU-3020 available from DATATECH Corp., which can assure precision of ±0.5° for each of the pitch and roll angles, and precision of ±0.9° for the yaw angle. Also, the geomagnetic azimuth sensor 42 used TMC-2000 available from Tokin Corporation, which can assure precision of ±2°.

Note that arithmetic operations of location information based on signals from the GPS sensor 40 may overload the PC 30 since they require high-speed processing. For this reason, as a modification of the data acquisition system shown in FIG. 3, a PC dedicated to GPS data arithmetic operations may be added.

Figure 4:
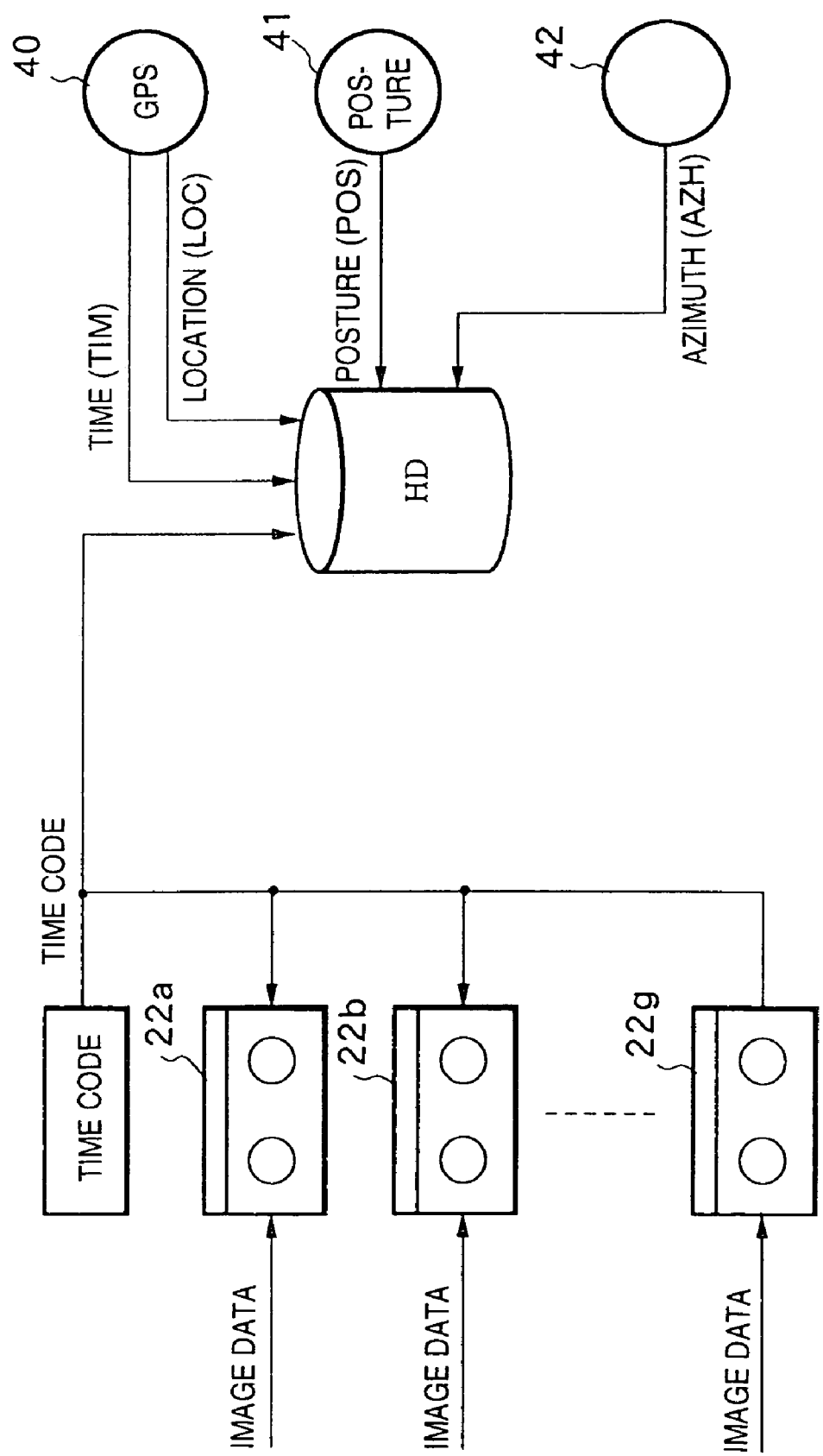
FIG. 4 is a diagram showing the final storage locations of various data in the system shown in FIG. 3.

FIG. 4 shows the recording locations of various data acquired by the system shown in FIG. 3.

As is known, the kinematic GPS sensor outputs high-precision time and location data.

In FIG. 4, a hard disk HD of the PC 30 stores "time codes" from the cameras 20, "time data" and "location information data" from the sensor 40, "posture information data (POS)" from the posture sensor 41, and "azimuth information (AZM)" from the azimuth sensor 42.

Figure 5:
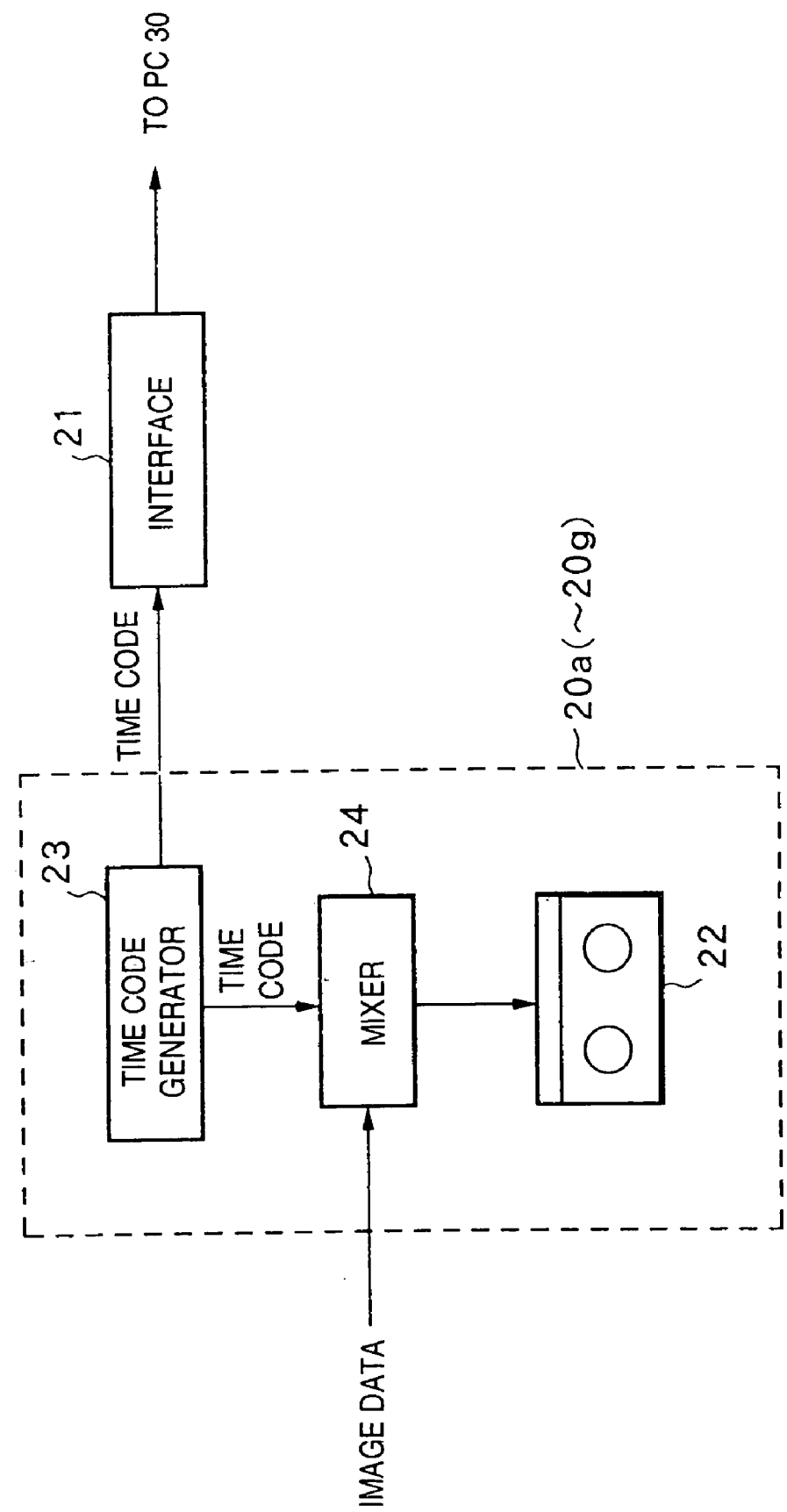
FIG. 5 is a block diagram showing generation of a time code in a video camera 20 shown in FIG. 3.

In FIG. 4, sensed images from the individual cameras (20a, ..., 20g) are respectively recorded on video tapes 22a, 22b, ..., 22g. FIG. 5 shows a recording system in each camcorder (20a, ..., 20g). As is known, the camcorder 20 incorporates a time code generator 23, signal mixer 24, and video tape 22 for data recording. The time code generator 23 outputs time codes for indexing image frames. That is, the time codes are recorded on the tape together with image data, and specify the frame positions of the recorded image data.

In FIG. 5, the time codes from the time code generator 23 and image data from a CCD sensor (not shown) are recorded on the tape 22 by the mixer 24 in accordance with a predetermined format.

Figure 6:
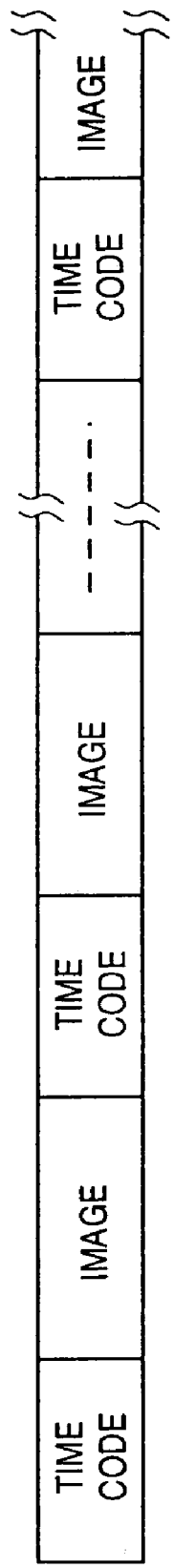
FIG. 6 is a view for explaining the format of data recorded on a video tape 22 of the video camera 20.

FIG. 6 shows an example of the recording format of the two types of data (image data and time code data) recorded on the tape 22 of the camera 20. More specifically, on the tape, one time code is assigned to each image frame. In other words, target image data on a given tape 22 can be searched on that tape 22 by designating the time code corresponding to the image data.

Figure 7:
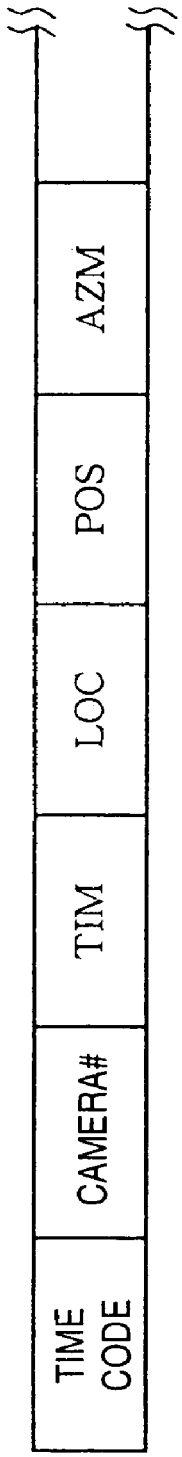
FIG. 7 is a view for explaining the format of data recorded in a hardware disk HD of a PC 30.

FIG. 7 shows an example of the recording format of one record of various kinds of information in the hard disk HD.

Upon receiving a time code at an arbitrary timing from an arbitrary camera, the PC 30 writes a set of "time data" (received from the sensor 40), "location information" (received from the sensor 40) of the vehicle, "posture information" from the posture sensor 41, and "azimuth information" from the azimuth sensor 42 at that time in the disk HD as a time code/sensor information record file (in the format shown in FIG. 7). More specifically, one time code/sensor information record consists of the value of a time code TC, a time TIM at that time, number # of the camera that generated the time code, vehicle location data LOC, posture data POS, and azimuth data AZM of the vehicle at the time of reception of the time code, and the like.

As shown in FIG. 4, in the image acquisition system of this embodiment, images are recorded on the magnetic tapes, and the location information and time codes are recorded on the hard disk of the PC 30.

As can be seen from the "time code/sensor information record" shown in FIG. 7, if the value of a certain time $t_x$ is given, a record having TIM close to the value of that time $t_x$ can be detected, and the time code TC, vehicle location LOC, posture POS, and azimuth AZM can be detected from the record. Using the value of the obtained time code TC, the tape 22 can be searched to acquire target image data. In this fashion, arbitrary image data on the tape can be combined with the image sensing location and time of that image data.

The data acquisition system shown in FIG. 3 is directed to generation of reference image data which are used for generating an image database suitable for generating a panoramic image.

Note that signals that can represent the locations of sensor data and image data correspond to the time code in the camera, and time data from the sensor 40 in the sensor signals. In an image database, image data need only be finally linked to the location information and posture data of the vehicle. Hence, the file format stored in the data acquisition system of this embodiment is not limited to those shown in FIGS. 6 and 7. For example, two or more hard disk drive units may be arranged in the PC 30, and various kinds of most suited sensor information may be stored in the individual disks.

Acquisition of data images (to be described later) corresponds to a modification of the data acquisition method shown in FIGS. 6 and 7.

<Camera Layout> . . . Acquisition System

Figure 8:
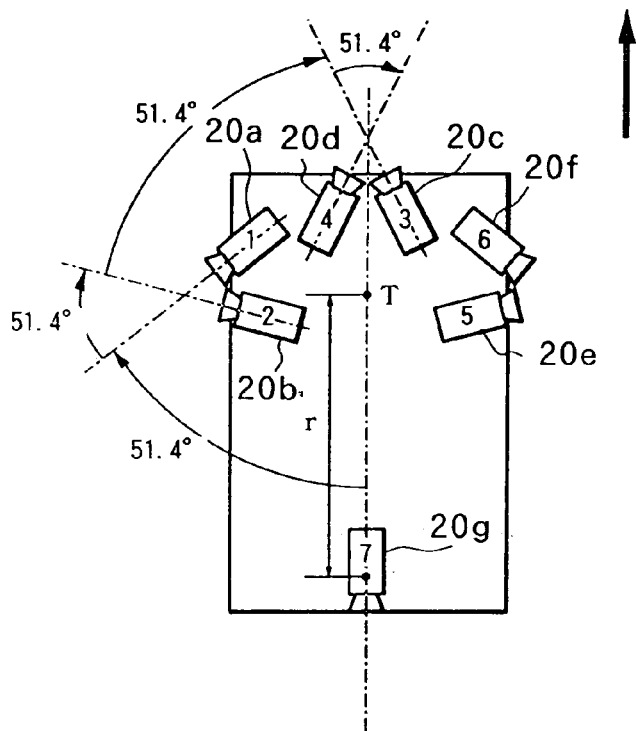
FIG. 8 is a view for explaining the feature of camera layout of the embodiment shown in FIG. 3.

FIG. 8 shows the layout of the seven cameras (20a to 20g) on the vehicle in the data acquisition system of this embodiment.

Figure 9:
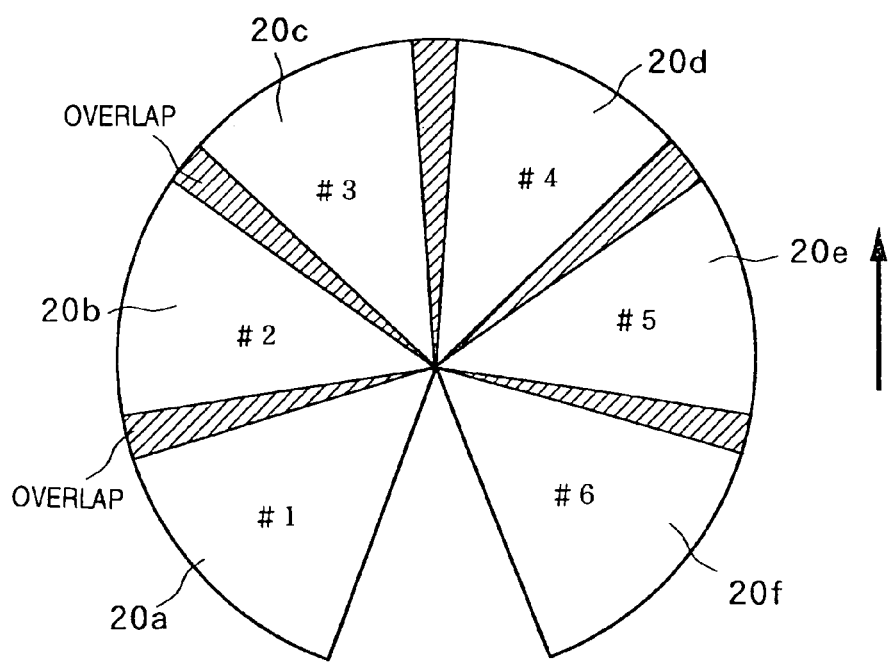
FIG. 9 is a view for explaining the image sensing azimuths of cameras #1 to #6 in the camera layout shown in FIG. 8.

In FIG. 8, the upward direction (indicated by an arrow) in FIG. 8 agrees with the direction the vehicle travels. As shown in FIGS. 8 and 9, the camera 20c (camera #3) and camera 20d (camera #4) are used for sensing an environment in the traveling direction of the vehicle, the camera 20a (camera #1) and camera 20b (camera #2) are used for sensing an environment on the left side of the vehicle, and the camera 20e (camera #5) and camera 20f (camera #6) are used for sensing an environment on the right side of the vehicle.

Note that each hatched region in FIG. 9 indicates a region where the image sensing angles of neighboring cameras overlap each other.

In FIG. 8, camera #7 (20g) is used for sensing a rear environment. The image sensing center of the camera 20 is separated a distance r backward from that (indicated by a point T in FIG. 8) of other cameras (20a to 20g). By setting the camera 20g on the rear portion of the vehicle, the camera 20g can be prevented from sensing the vehicle body due to the presence of many cameras, as has been described earlier in the paragraphs of the prior art. Since the camera 20g is set at the rear portion, many cameras can be prevented from overcrowding the central position T, and a high degree of freedom in layout of other cameras can be assured.

<Acquisition of Sensed Images> . . . Acquisition System

The processing flow for image data acquisition by the data acquisition system of this embodiment will be explained below.

Figure 10:
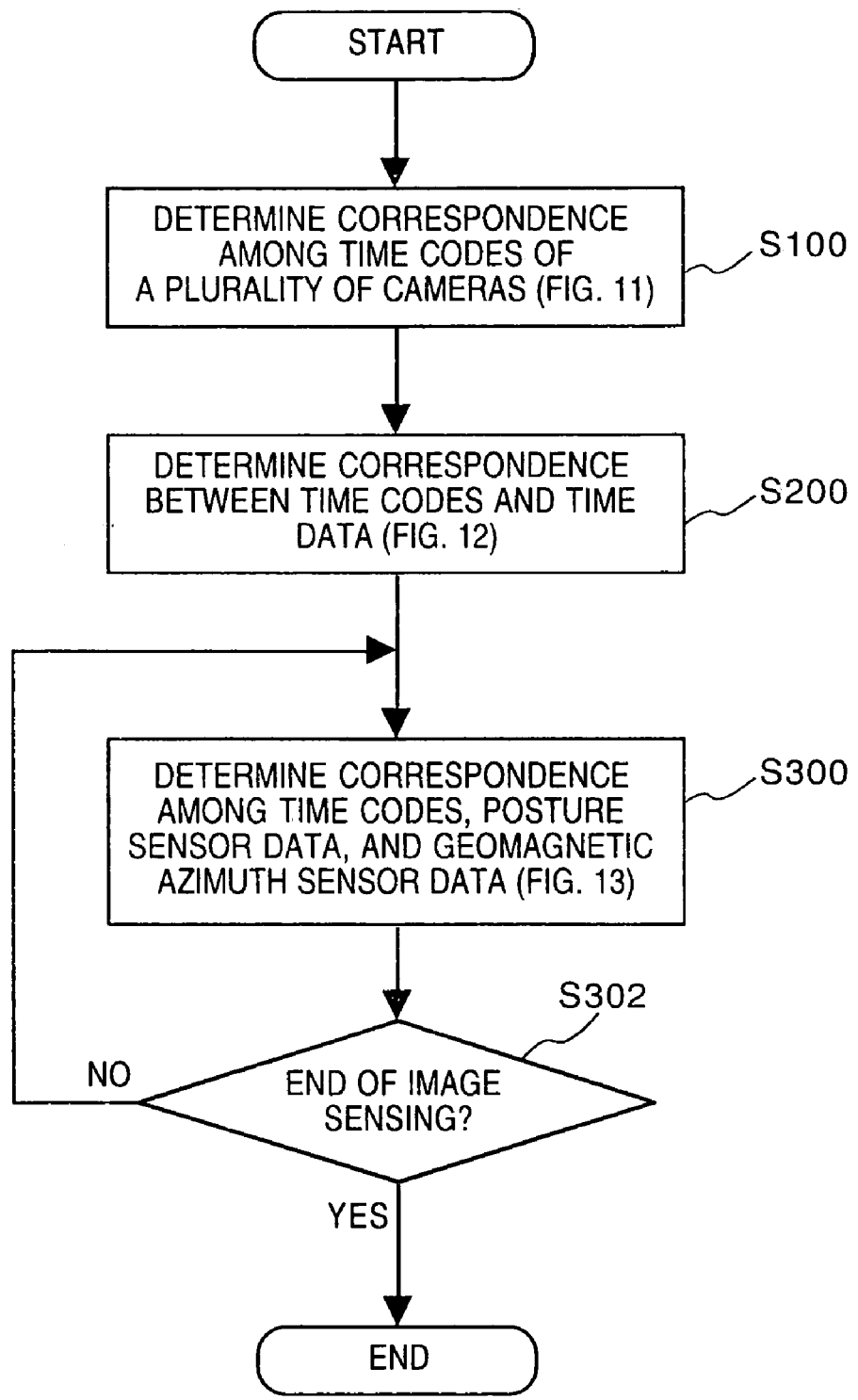
FIG. 10 is a flow chart showing the overall processing of the data acquisition system shown in FIG. 3.

FIG. 10 explains the overall sequence of the sensed image data acquisition controlled by the PC 30.

Steps S100 and S200 are initialization steps.

In step S100, a correspondence among time codes TC from all the cameras (20a to 20g) is determined. In step S200, a correspondence among the time codes TC and time data TIM from the GPS sensor is determined. In steps S100 and S200, any deviation between each time code TC from the camera and the time data TIM from the GPS sensor can be detected.

In step S300, a correspondence among the time codes TC and information from the individual sensors (posture sensor 41 and geomagnetic azimuth sensor 42) is determined. The processing in step S300 is repeated until image sensing is completed.

Figure 11:
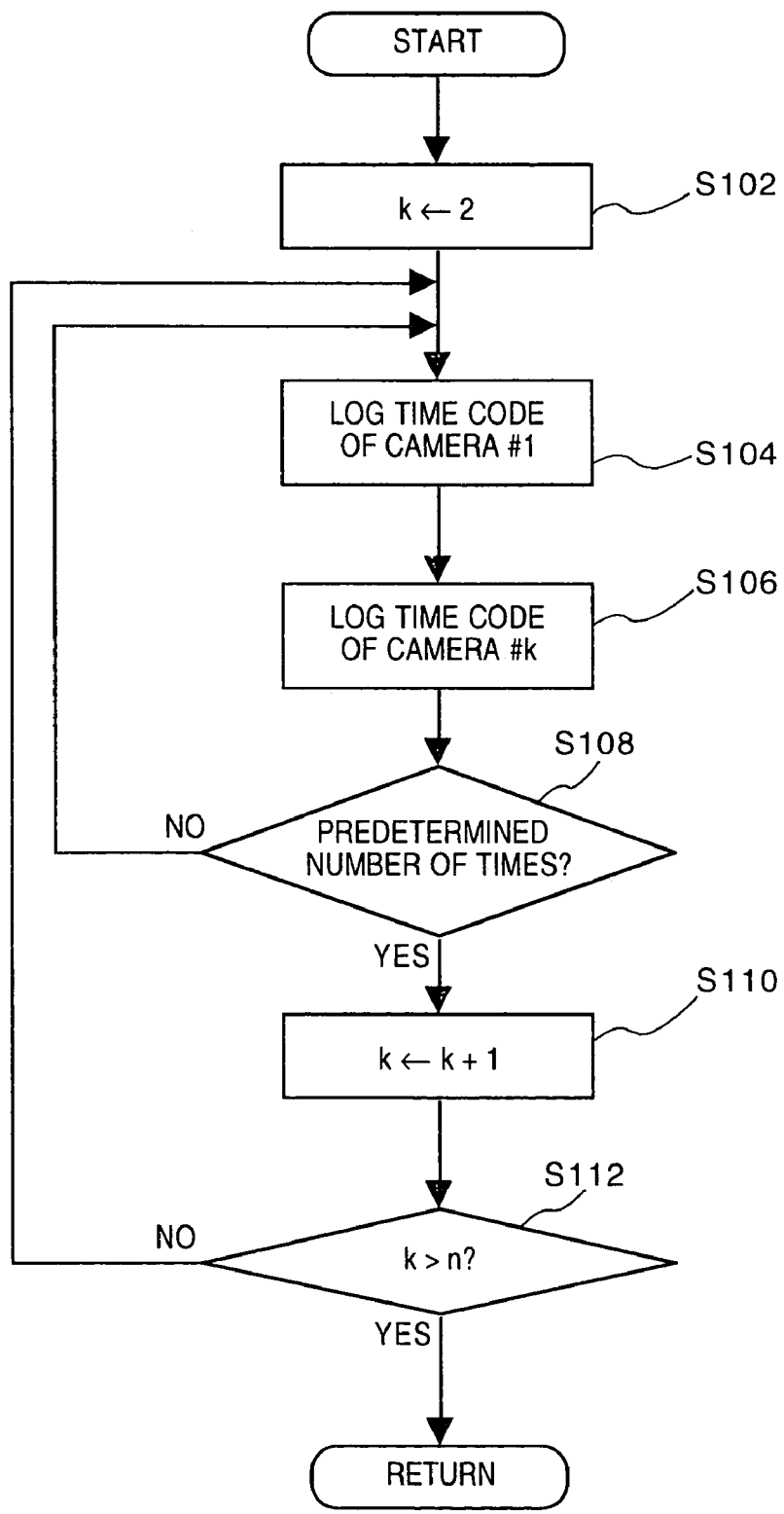
FIG. 11 is a flow chart for explaining some steps in the flow chart in FIG. 10 in more detail.

FIG. 11 shows the detailed sequence of "time code correspondence determination" processing in step S100.

More specifically, in step S102, the value of counter k indicating the camera number is set at "2". The reason why "2" is set is that camera #1 (camera 22a) is used as a reference camera for the sake of convenience. In step S104, one time code from camera #1 is logged. In step S106, one time code from camera #k is logged. In step S108, it is checked if the above-mentioned operations have been repeated a predetermined number of times (N). After the predetermined number of times of operations, N pairs of the time code value of camera #1 and the value of a time code $TC_k$ from arbitrary camera k among cameras #2 to #7 are obtained. By averaging these plurality of (N) pairs of data, a correspondence between the time codes of cameras #1 and #k, i.e., "deviation" (difference between $TC_1$ and $TC_k$) can be obtained. Such correspondence is obtained for all the cameras #2 to #7.

Figure 12:
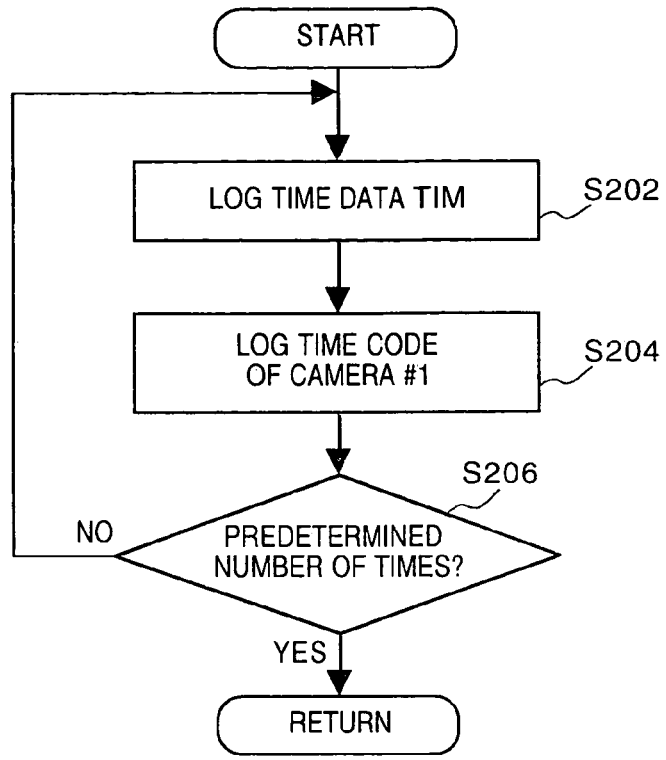
FIG. 12 is a flow chart for explaining some other steps in the flow chart in FIG. 10 in more detail.

FIG. 12 shows the detailed processing sequence for obtaining a correspondence between the time codes TC and time data TIM in step S200 in FIG. 10.

More specifically, in step S202, time data TIM is obtained from the GPS sensor. In step S204, the value of a time code $TC_1$ from camera #1 at time data TIM is logged. By repeating the above-mentioned operation several times, the difference between the value indicated by the time code $TC_1$ from camera #1 and the absolute time (the time TIM from the GPS sensor) can be detected.

More specifically, from the relationships obtained by the flow charts shown in FIGS. 11 and 12, when the time code from certain camera k is $TC_k$, the deviation between $TC_k$ and the time code $TC_1$ from camera #1, i.e., the time interval corresponding to the deviation therebetween can be recognized in advance.

The operation in step S300 in FIG. 10 is done in synchronism with capturing of surrounding images by the seven cameras 22a to 22g.

Figure 13:
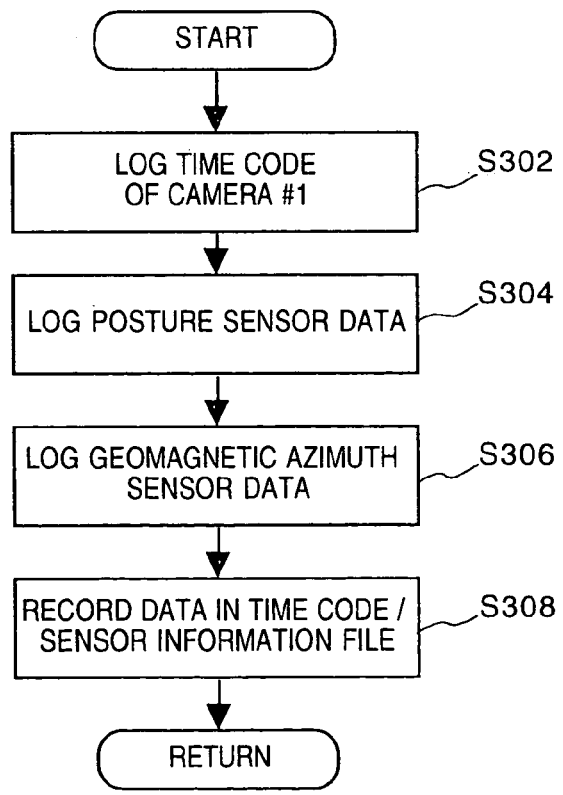
FIG. 13 is a flow chart for explaining some other steps in the flow chart in FIG. 10 in more detail.

FIG. 13 explains step S300 in detail. More specifically, in step S302, a time code $TC_1$ is received from reference camera #1. In step S304, posture data (pitch, roll, and yaw angles) from the posture sensor 41 are stored. In step S306, data from the azimuth sensor 42 is acquired. In step S308, based on the obtained time code $TC_1$ and sensor data, one record is recorded in the time code/sensor information file in the hard disk HD.

<Assure Degree of Freedom in Camera Layout> . . . Acquisition System

In FIG. 8, camera #7 (20g) senses a rear environment. The image sensing center of the camera 20 is separated the distance r from that (indicated by the point T in FIG. 8) of other cameras (20a to 20f). Since the camera 20g is set on the rear portion of the vehicle separated by the distance r, the camera 20g can be prevented from sensing the vehicle body, and a high degree of freedom in layout of many cameras can be assured. More specifically, too much cameras can be prevented from covering the central position T.

However, in the camera layout shown in FIG. 8, seven images simultaneously sensed by the seven cameras are to be processed as a set of image data simultaneously sensed at a single point. As has been described in the paragraphs of the prior art, when one interpolated image is generated from sensed images sensed at two discontinuous locations, if these two image sensing locations are excessively separated, i.e., if the camera 20g is separated farther from the camera 20a (i.e., large r is set) to assure a high degree of freedom in camera layout, the interpolated image and sensed images cannot be smoothly connected.

Figure 14:
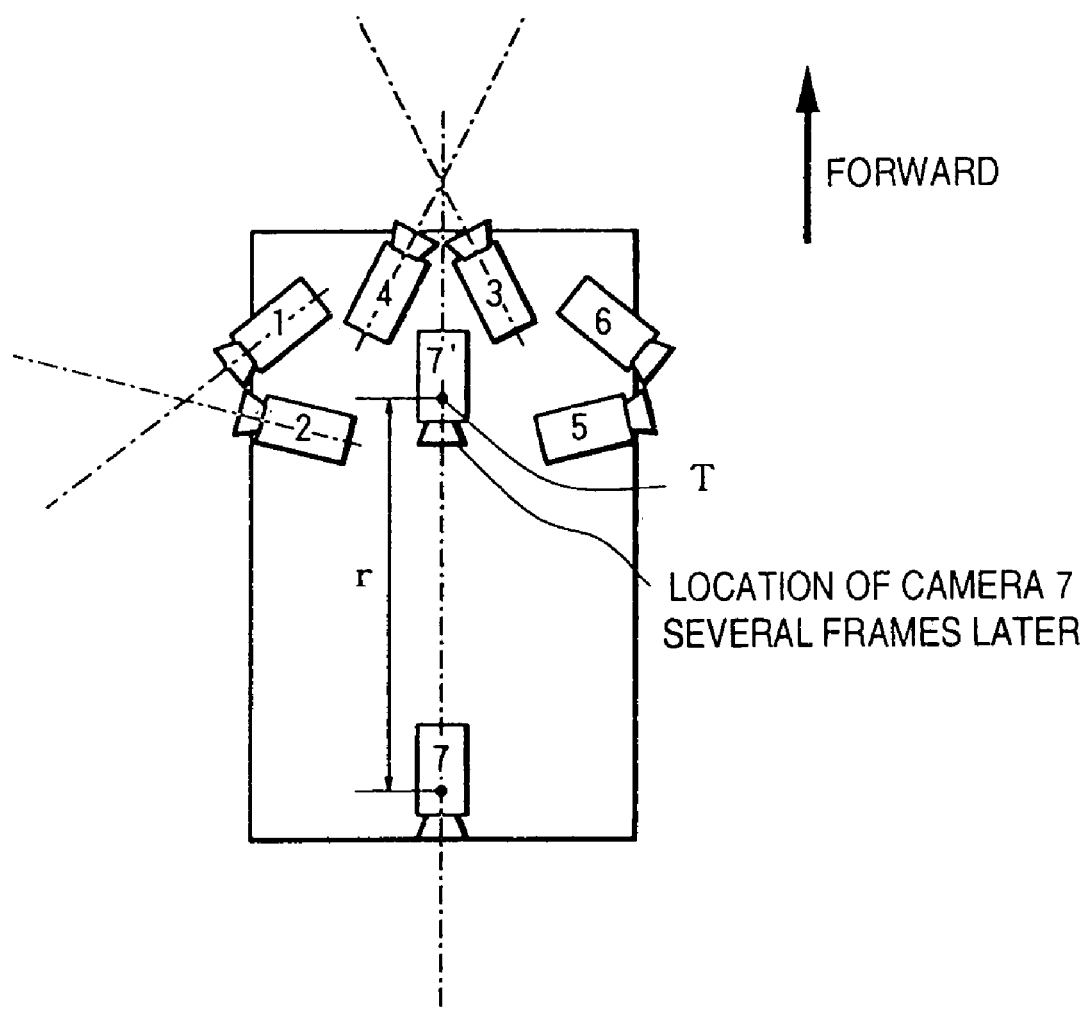
FIG. 14 is a view for explaining merits of the camera layout shown in FIG. 8.

In this system, in order to compensate for the deviation between image data arising from the distance r, as shown in FIG. 14, future image data a time duration Dt:

$$Dt = r/v$$

(v is the traveling velocity of the vehicle)

ahead of the time in question (time t), i.e., sensed image data which would have been sensed by camera #7 Dt (=r/v) after time t (camera #7 must have reached the position T by that time), is used together with image data sensed by cameras #1 to #6 at the locations at time t (i.e., the locations illustrated in FIG. 14).

Figure 15:
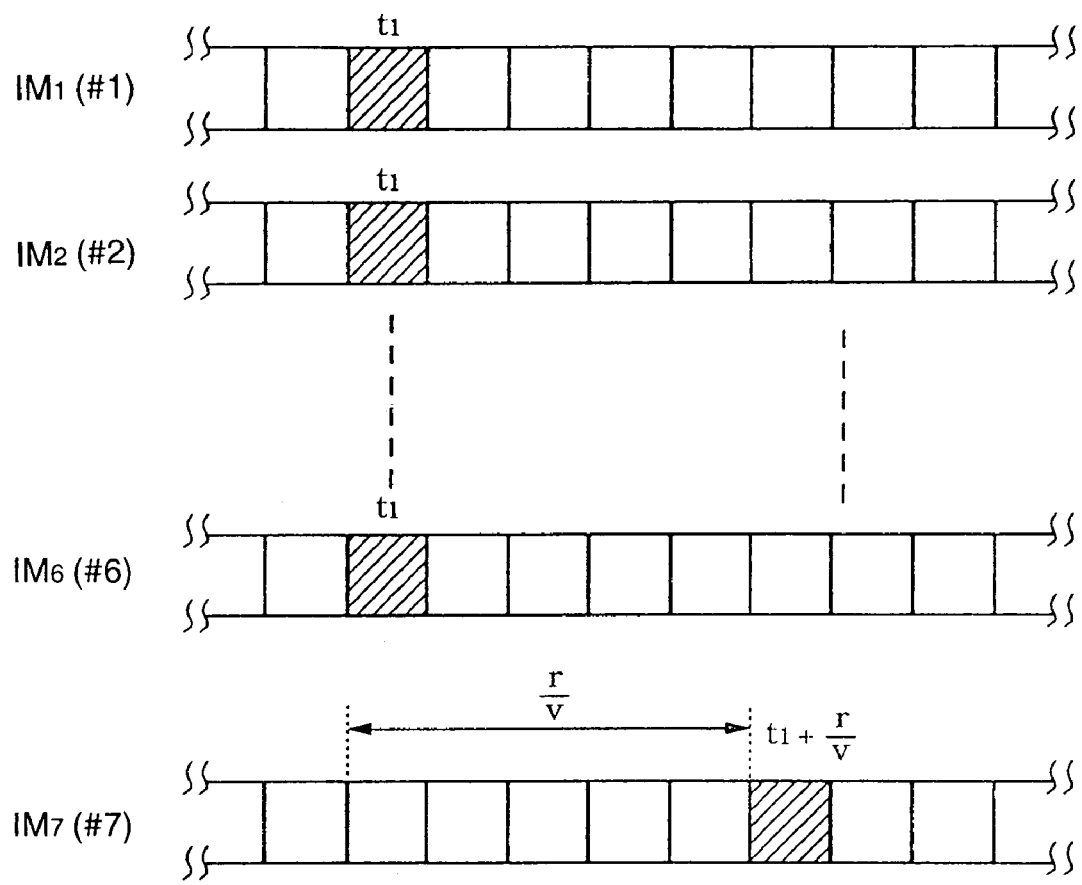
FIG. 15 is a chart for explaining the times of image data to be combined in one record of an image database.

More specifically, in order to realize a wide-area walk-through system, an image database as a basis for generating an interpolated image from sensed images must be formed by relating sensed images (stores on the magnetic tapes 22a to 22g) from cameras #1 to #7 with each other. As shown in FIG. 15, images sensed by cameras #1 to #6 at actually the same time (e.g., time $t_1$), i.e., images $IM_1(t_1)$ to $IM_6(t_1)$ having the same "time data" are combined in one record of the database, and as for image data $IM_7$ from camera #7 (20g), image data $IM_7(t_1+r/v)$ at time $t_1+Dt$:

$$t_1+(r/v)$$

is combined in that record.

As described above, in the data acquisition system shown in FIG. 3, the time codes of the cameras have deviations. Hence, the processing shown in FIG. 15 is executed as follows in the data acquisition system shown in FIG. 3. That is, assume that the deviation of the time code $TC_7$ from camera #7 with respect to the time code $TC_1$ from camera #1 obtained by the control sequence in FIG. 11 is DTC, i.e., the time code $TC_7$ from camera #7 advances (delays if DTC<0) by time DTC from the time code $TC_1$ from camera #1. In this case, image data recorded at a future location by a time duration:

$$DTC+Dt$$

(for Dt=r/v) with respect to reference time t of camera #1 is used.

<Database Generation System>

Figure 16:
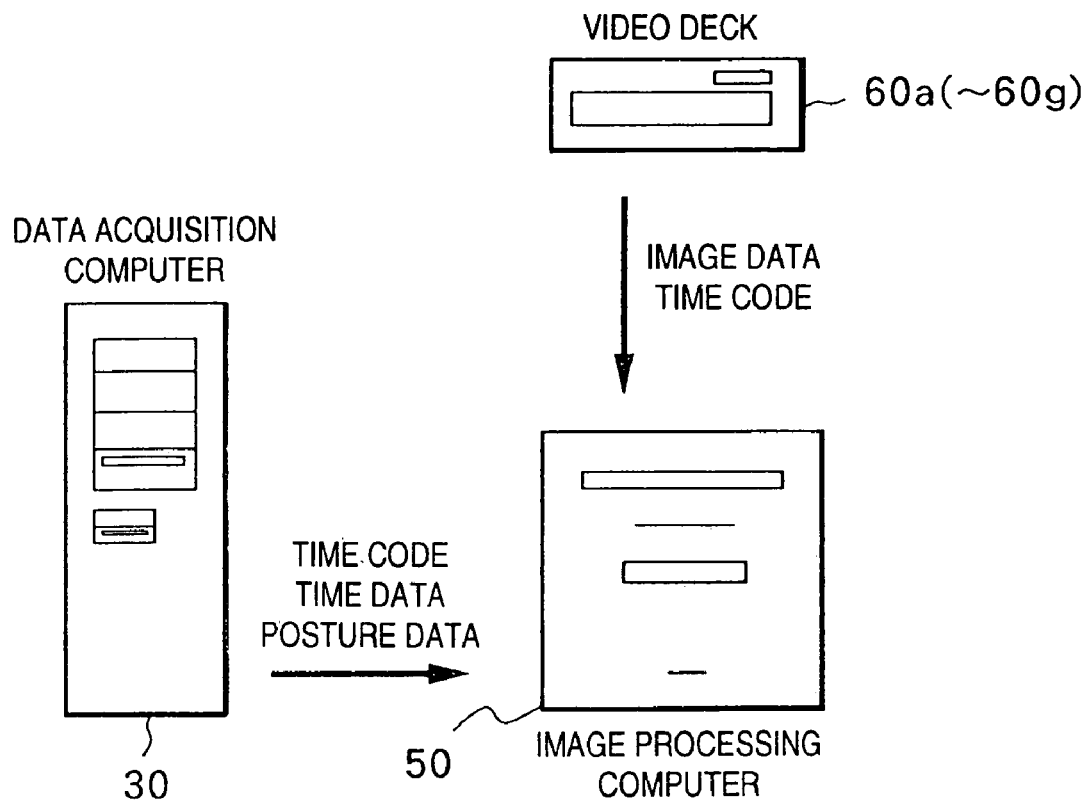
FIG. 16 is a block diagram showing the arrangement of a database generation system according to an embodiment of the present invention.

FIG. 16 shows the arrangement of a "database generation system" for generating an image database used for synthesizing a panoramic image from the data acquisition system shown in FIG. 3. More specifically, this generation system is connected to the above-mentioned "data acquisition system" made up of the PC 30, as shown in FIG. 16, and generates a database suitable for image interpolation for the purpose of wide-area walkthrough image presentation on the basis of video tape files and magnetic disk files (HD in the PC 30) obtained by the "data acquisition system".

The data acquisition system shown in FIG. 3 generates two files shown in FIGS. 6 and 7 in addition to the files on the magnetic tapes 22a to 22g. These two files are linked to each other by time codes TC. More specifically, image data of arbitrary frames on the magnetic tapes 22a to 22g are linked to the camera locations, postures, and azimuths upon sensing those image data via the time codes TC. Therefore, when images for seven scenes sensed by the seven cameras at a certain image sensing time or timing are required, these image data for the seven scenes can be desirably picked up from the seven magnetic tapes using the time code TC. However, the search of the magnetic tape for a target image frame is time-intensive. The primary objective of the database generation system of this embodiment is to exclude images of unnecessary scenes and to move only images of required frames from a low-speed tape to a high-speed file (e.g., a magnetic disk file).

The system shown in FIG. 3 cannot often generate the time code/sensor information file shown in FIG. 6 due to too much data volume to be processed. In other words, the system shown in FIG. 3 divides the time code/sensor information file shown in FIG. 6 into different files, and stores time code data TC, time data TIM, and posture data in one file (to be referred to a "first logging file" hereinafter), and location data and time data TIM in another file (to be referred to a "second logging file" hereinafter), as shown in, e.g., Fig. 17. Also, image data are recorded on the tape as a "third logging file" including a pair of sensed image and time code. Note that the first and second logging files have large data volumes since a record is generated every time the output from the GPS sensor 40 is generated and, hence, high precision upon image interpolation can be assured.

The database generation system to be described below converts the three logging files shown in FIG. 17 generated by the data acquisition system shown in FIG. 3 into a database.

In FIG. 16, a database is generated by an image processing computer 50. Video tape files are set in and loaded by video decks 60a to 60g. Also, the PC 30 is connected to the computer 50.

Figure 18:
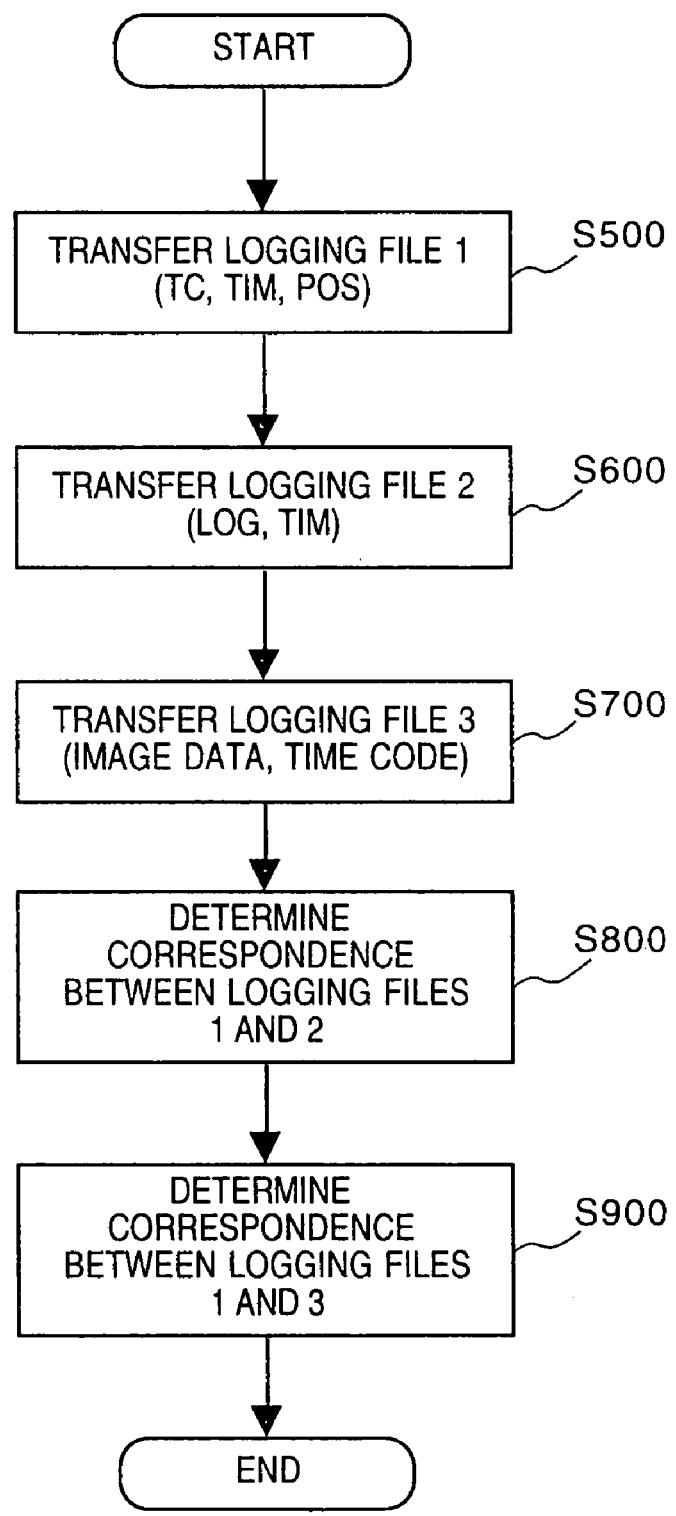
FIG. 18 is a flow chart for explaining the basic principle of control for database generation of the embodiment shown in FIG. 16.

FIG. 18 shows the overall processing flow of the computer 50.

In step S500, the first logging file is transferred from the PC 30 to the computer 50. Instep S600, the second logging file is transferred to the computer 50. In step S700, the third logging file is transferred from each video deck 60 to the computer 50.

Figure 19:
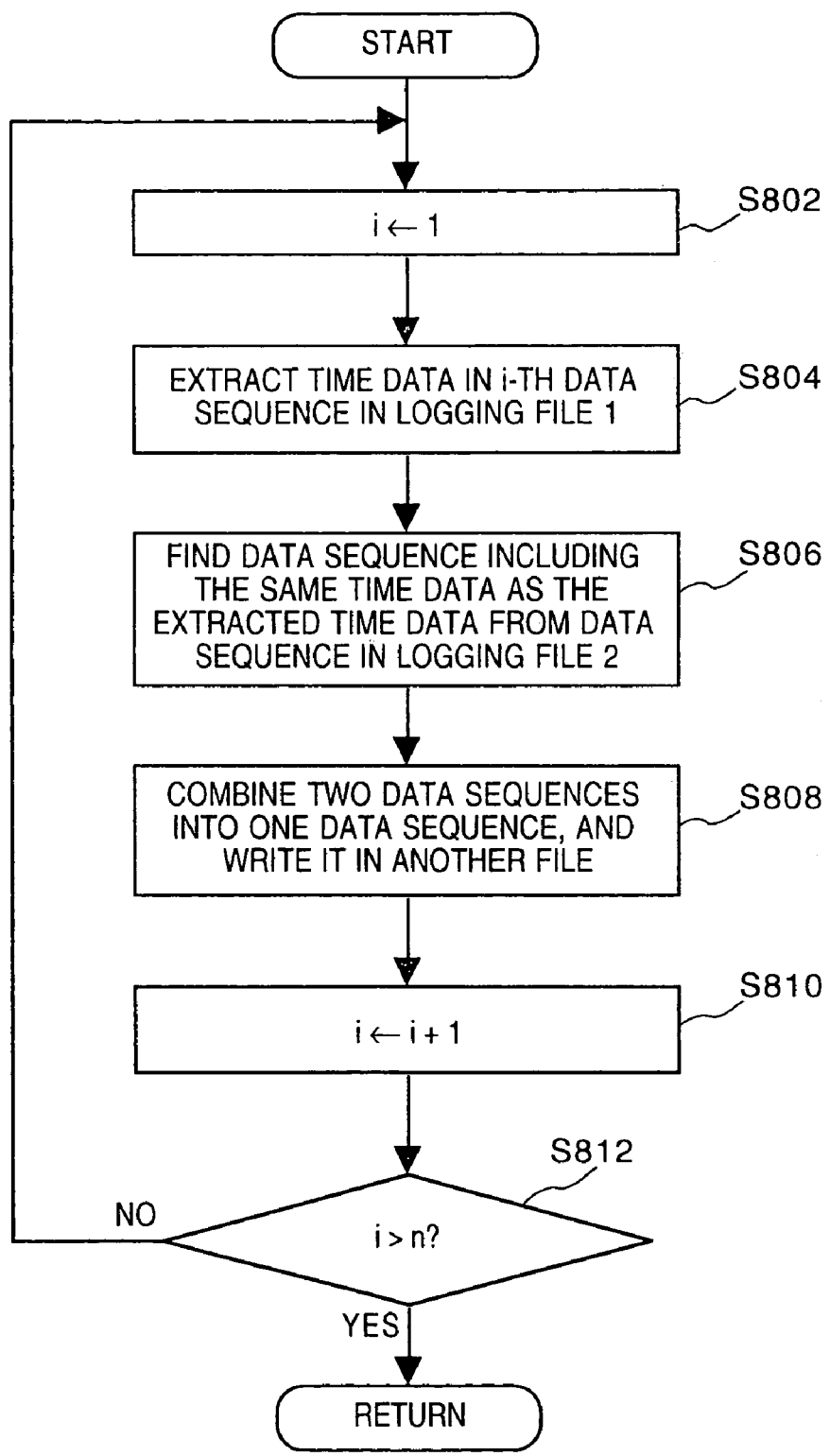
FIG. 19 is a flow chart for explaining some steps in the flow chart in FIG. 18 in more detail.

In step S800, a correspondence between the first and second logging files is determined using time data TIM as a key. FIG. 19 shows the processing of this step in more detail. The processing result is stored in a hard disk (not shown) in the computer 50.

Figure 20:
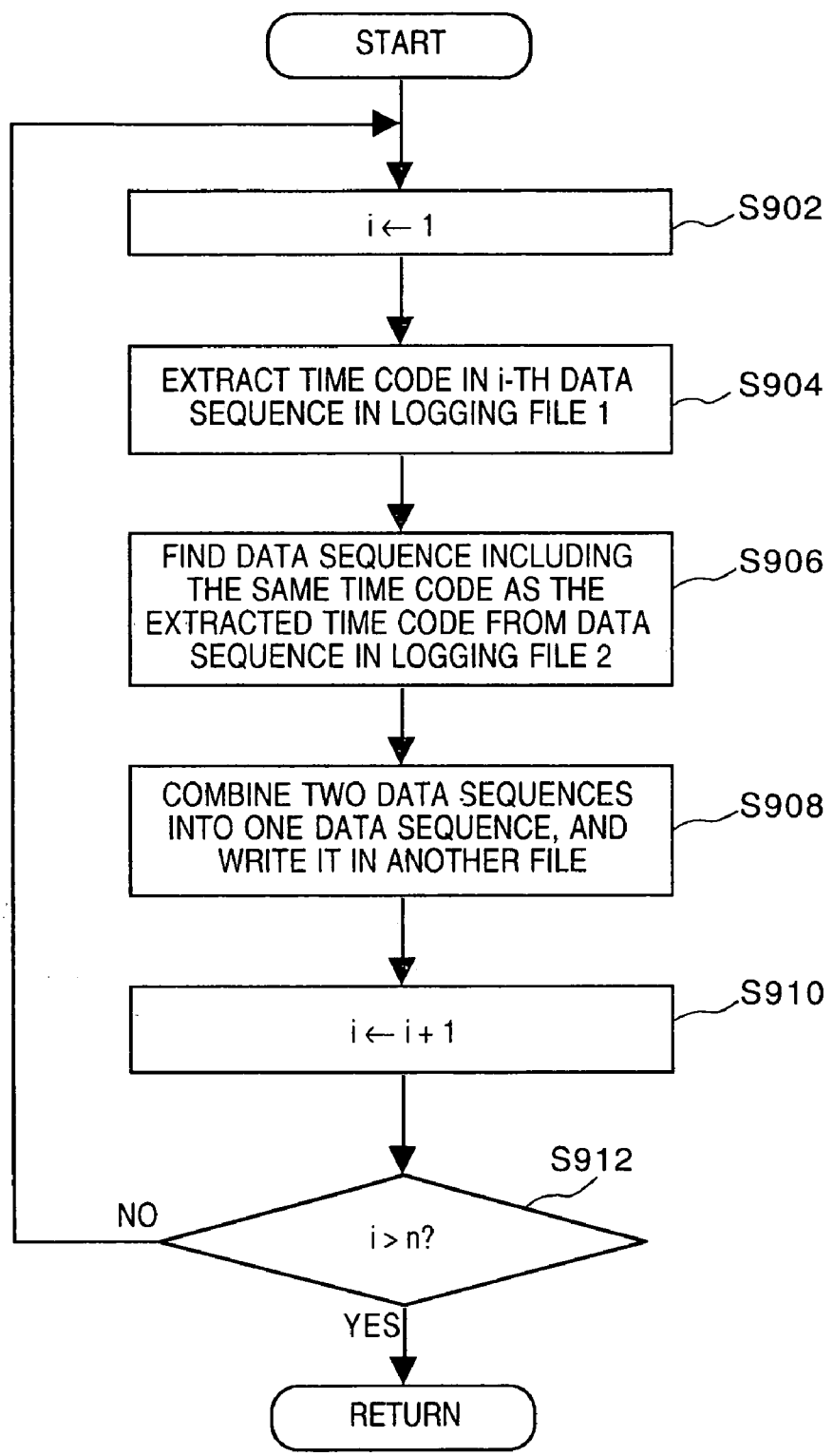
FIG. 20 is a flow chart for explaining some other steps in the flow chart in FIG. 18 in more detail.

In step S900, a correspondence between the first and third logging files is determined using time code data TC as a key. FIG. 20 shows the processing of this step in more detail. The processing result is also stored in a hard disk (not shown) in the computer 50.

Note that an image from camera #7 of cameras #1 to #7 must proceed to processing different from those for images from other cameras, as has been described above in association with FIG. 8. Hence, the correspondence determination between the first and second logging files (step S806) and the correspondence determination between the first and third logging files (step S906) are modified to the control sequence shown in FIG. 21.

Figure 21:
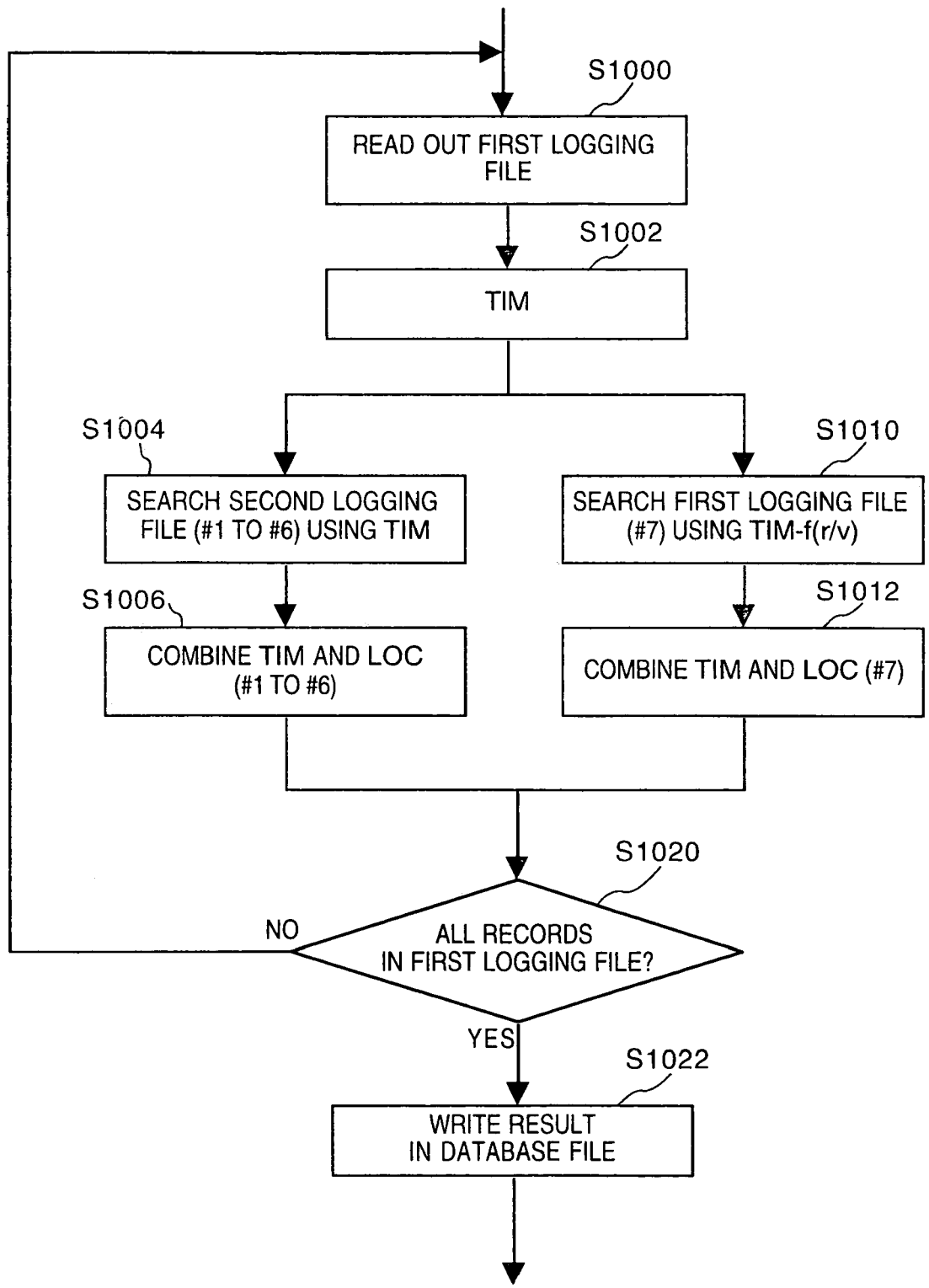
FIG. 21 is a flow chart showing the control sequence for converting image data from camera #7 into that from a camera located at a position 7' in the camera layout shown in FIG. 14.

More specifically, one record in the first logging file is read out in step S1000 in FIG. 21, and time data TIM is detected from the readout record in step S1002.

As for image data from cameras #1 to #6, the second logging file for each of cameras #1 to #6 is searched to find records with TIM having the same value as the detected time data TIM in step S1004. In step S1006, the record in the first logging file found in step S1000 and the records in the second logging files found in step S1004 are combined (in effect, information TIM and information LOC are combined).

On the other hand, as for camera #7, equation (1) below is calculated using the time data TIM obtained in step S1002:

$$TIM = TIM - f\left(\frac{r}{v}\right) \tag{1}$$

Then, the second logging file of camera #7 is searched for a record with TIM having the same value as the time data TIM given by equation (1) above. Note that f in equation (1)

represents the function of converting the time duration r/v into that required in the data acquisition system of this embodiment. In step S1012, the record in the first logging file found in step S1000 and the record in the second logging file found in step S1010 are combined.

In step S1020, it is checked if the above-mentioned processing is complete for all the records in the first logging file. If YES instep S1020, the flow advances to step S1022, and a record obtained by combining those in the first and second logging files is written in a database file.

In this manner, a database system that allows easy image interpolation for wide-area walkthrough is generated in the computer 50.

<Generation of Panoramic Image>

Figure 22:
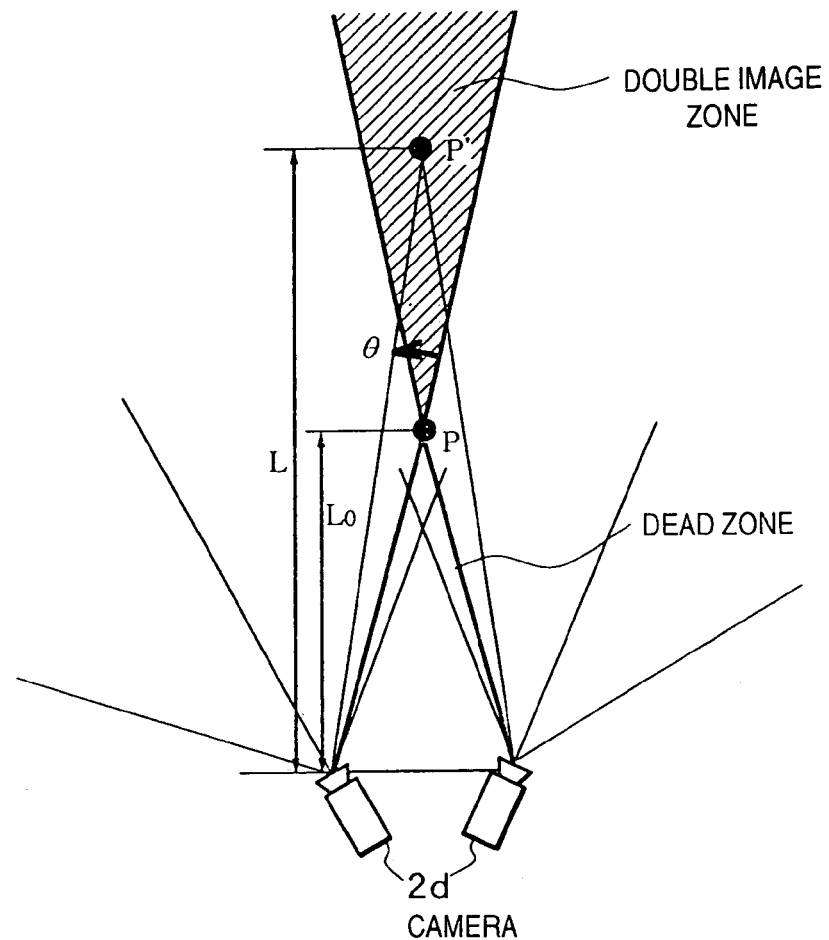
FIG. 22 is a view for explaining production of a dead zone and double-image zone upon generation of a panoramic image in the embodiment shown in FIG. 16.

FIG. 22 is a view for explaining the overlap angle between adjacent field ranges of the six cameras (20a to 20g) shown in FIG. 8.

A general case will be examined below wherein images are synthesized (a panoramic image is generated) so that images of an object P located at a distance Lo are smoothly connected upon interpolation of images obtained from two cameras (having the same field angle) which are separated by a distance 2d. A triangular region having a point P as a vertex in front of the cameras is a dead zone. A point P' is the one in a region doubly sensed by both the cameras. If the point P' is a distance L (L>$L_0$) from the camera, the point P' is imaged on the center side of the point P in each image by an angle:

$$\theta = \tan^{-1}\left(\frac{L}{d}\right) - \tan^{-1}\left(\frac{L_0}{d}\right) \quad (2)$$

Hence, when the two images are connected, the object P forms double images, and the difference between the imaging locations of the double images is:

$$2\theta = 2\left(\tan^{-1}\left(\frac{L}{d}\right)\tan^{-1}\left(\frac{L_0}{d}\right)\right) \quad (3)$$

The overlap angle between a pair of cameras (20a and 20b, 20c and 20d, or 20e and 20f) is set in consideration of the above difference.

Upon calculating the difference between cameras #2 and #3 or cameras #4 and #5, the image sensing centers of which are separated by the largest distance, if the joint between images of an object 3 m ahead of the cameras is optimized, an object 10 m ahead of the cameras forms double images with an angle difference of 6.5° (1.1 m in distance), and an infinity object forms double images with an angle difference of 9.3°.

As for cameras #1 to #6, since their image sensing centers are close to each other, image interpolation is performed in consideration of double imaging taking the above equation into account. On the other as for image data from camera #7 (20g), since image data at time:

$t_1+(r/v)$ is recorded as that at time $t_1$, image interpolation is performed using image data for camera #7 (20g) in the database.

In order to obtain a single panoramic image by synthesis, a virtual projection plane must be converted from a flat plane to a cylindrical plane.

Figure 23:
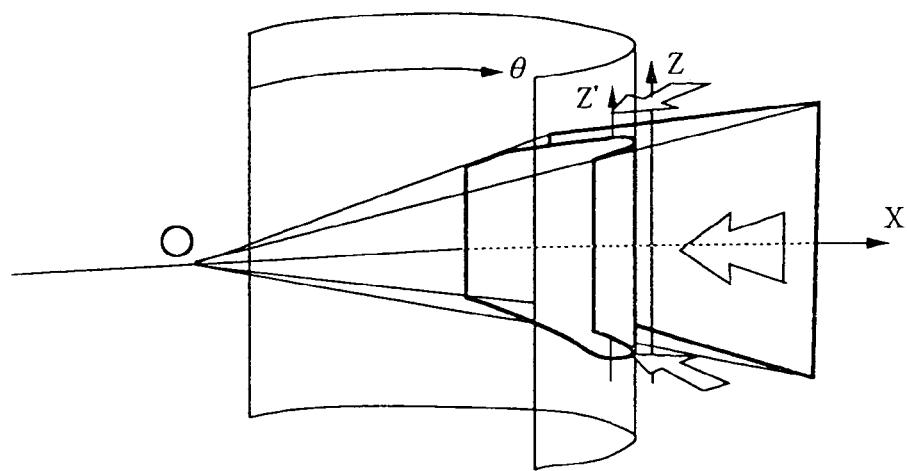
FIG. 23 is a view for explaining the principle of projection onto a cylinder to achieve panoramic image generation.

Assuming an image (horizontal: 2Z, vertical 2X) sensed by a camera which points in the direction of absolute azimuth $\theta_0$ and has a horizontal field angle $2\cdot\theta_x$, as shown in FIG. 23. In this image, if an image located at a position separated z vertically and x horizontally from the center of the image is projected into a cylindrical projection plane, the projection position ($\theta$, z') is given by:

$$\theta = \tan_{-1}\left(\frac{x}{X}\bullet\tan\theta_\omega\right) + \theta_0 \quad (4)$$

$$z' = \frac{z}{\sqrt{1 + \left(\frac{x}{X}\bullet\tan\theta_\omega\right)^2}}$$

are horizontally arranged in line to obtain a single panoramic image. The overlapping portion between adjacent images is subjected to blending to provide a continuous change.

When panoramic images are formed using the image database including a large number of images sensed by the seven cameras, a panoramic image database is formed. The images in the panoramic image database are used as source images in the walkthrough system of this embodiment.

<Modification of Data Acquisition> . . . First Modification

The data acquisition shown in FIGS. 10 and 11 is effective when the outputs are obtained from the posture sensor 41 irregularly.

A modification to be described below is effective when the outputs are obtained from the posture sensor 41 at predetermined periods and all data are picked up. More specifically, the control sequence shown in FIG. 24 replaces that shown in FIG. 10. The control in step S1100 is equivalent to that in step S100. The control in step S1200 is equivalent to that in step S200.

Figure 25:
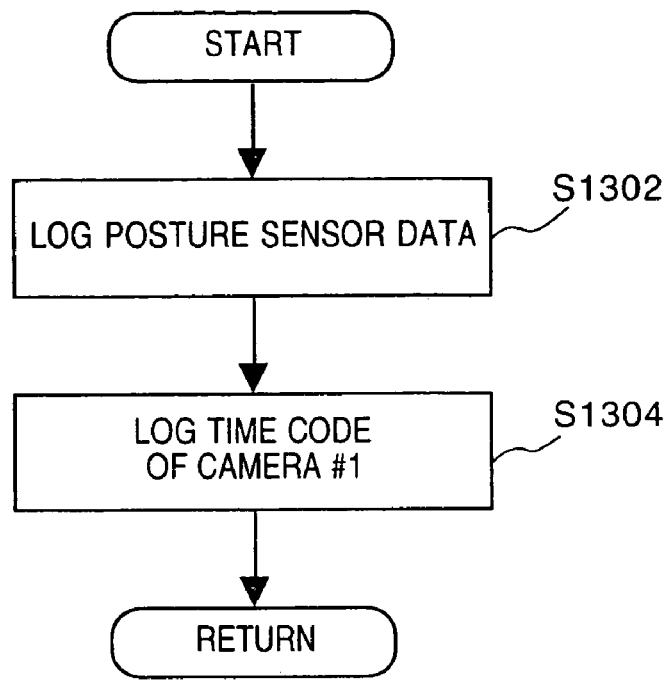
FIG. 25 is a flow chart for explaining some steps in the flow chart in FIG. 24 in more detail.

In step S1300, a correspondence between the time code TC and the output POS from the posture sensor 41 is determined. More specifically, output data from the posture-sensor 41 is logged in step S1302 in FIG. 25, and the time code from camera #1 is logged in step S1304. After that, a pair of these data are written in the disk.

Figure 24:
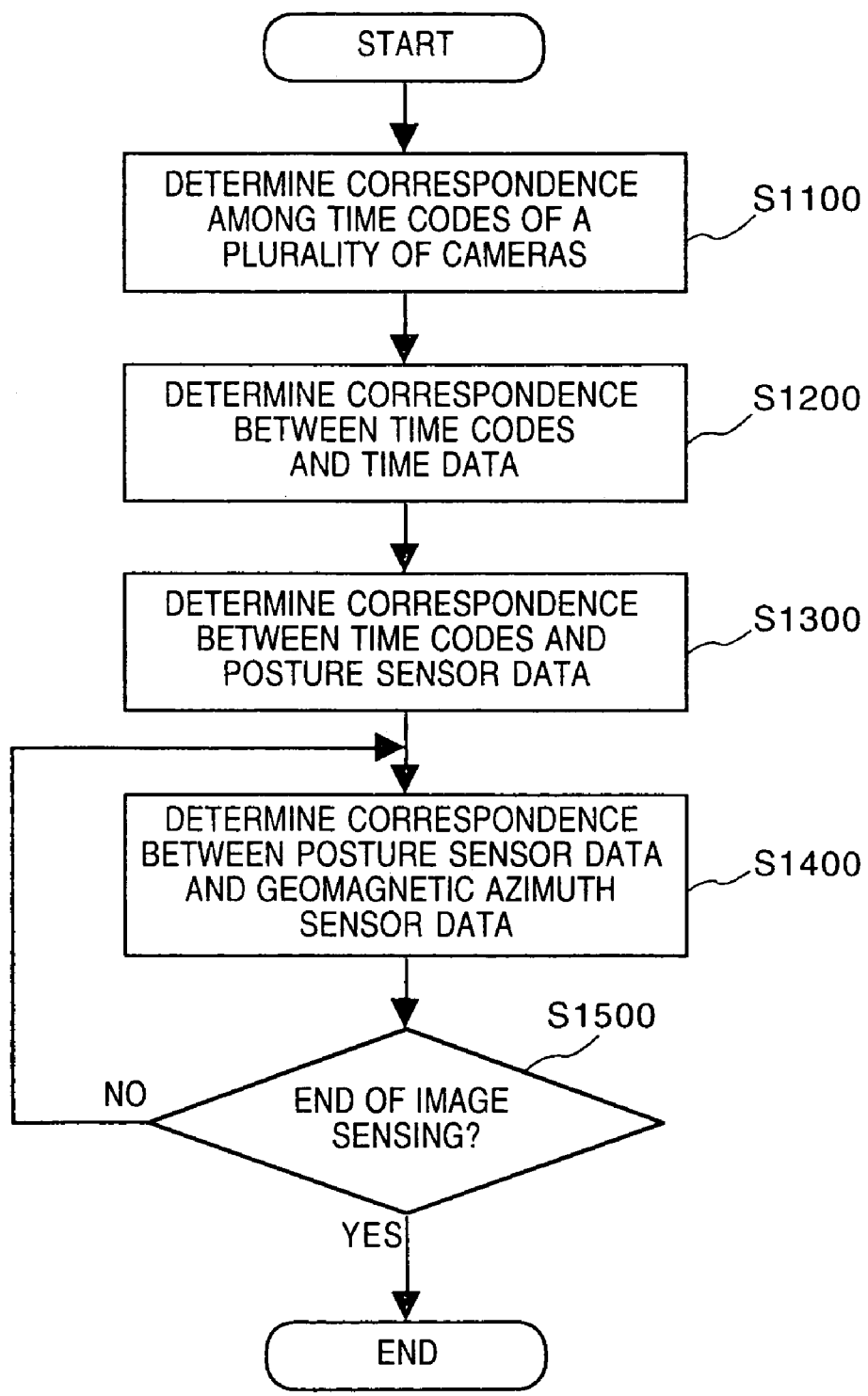
FIG. 24 is a flow chart showing the control sequence according to a modification of the control sequence shown in FIG. 10.
Figure 26:
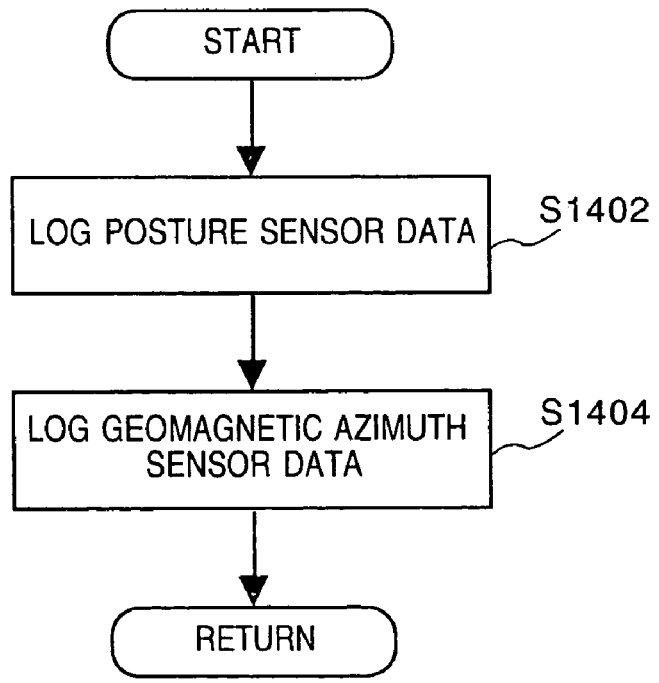
FIG. 26 is a flow chart for explaining some other steps in the flow chart in FIG. 24 in more detail.

In step S1400 in FIG. 24, a correspondence between the output data POS from the posture sensor 41 and the output AZM from the azimuth sensor 42 is determined. More specifically, the output from the posture sensor 41 is logged in step S1402 in FIG. 26, and the output from the azimuth sensor 42 is logged in step S1404. In this way, the outputs from the posture sensor 41 and the azimuth sensor 42 are logged as a pair of data.

With the method shown in FIG. 24, since no time code is considered in a loop between steps S1500 and S1400, data acquisition can be done at high speed.

<Modification of Camera Layout> . . . Second Modification

In the camera layout shown in FIG. 8, only one camera 20g is set as that for sensing a rear background. In order to cover the rear field of view using a single camera, the camera 20g must be set to have a wide field angle. However, when a wide field angle is set, the resolution of the surrounding image portion drops, and images cannot often be smoothly connected upon image interpolation. Also, the camera layout shown in FIG. 8 has no problem when the vehicle travels straight, but poses problems when the vehicle turns to the right or left.

Figure 27:
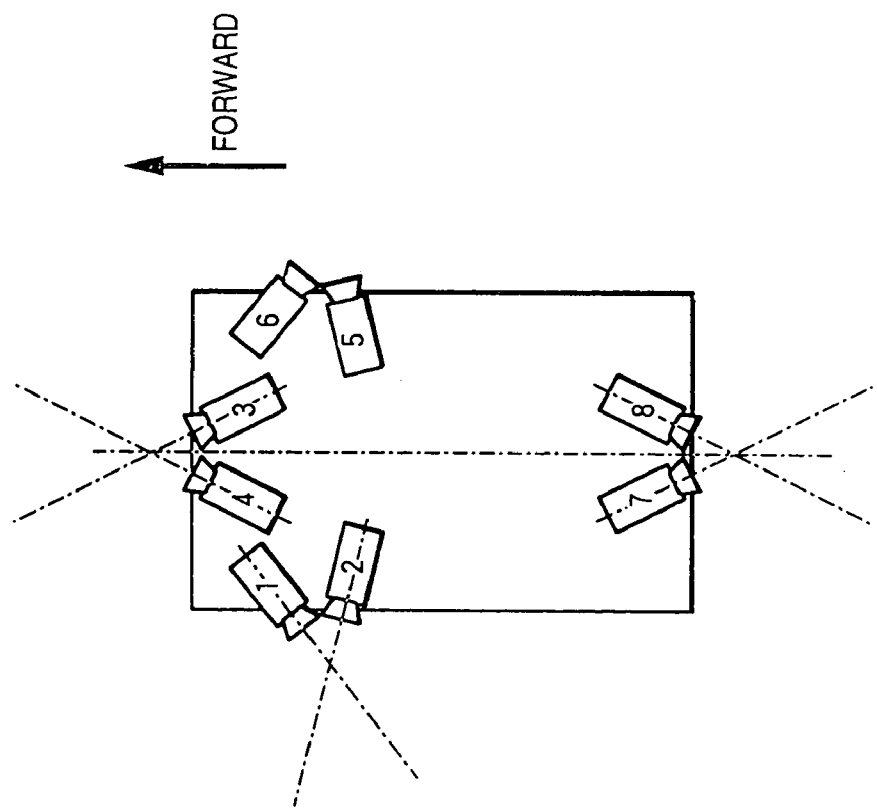
FIG. 27 is a view for explaining another camera layout.

In a modification shown in FIG. 27, rear camera #8 is added. Since two rear cameras are used, the field of view of one camera (#7 or #8) can be narrowed. In order to reduce the dead zone, the optical axes of cameras #7 and #8 cross each other, as shown in FIG. 27.

Figure 28:
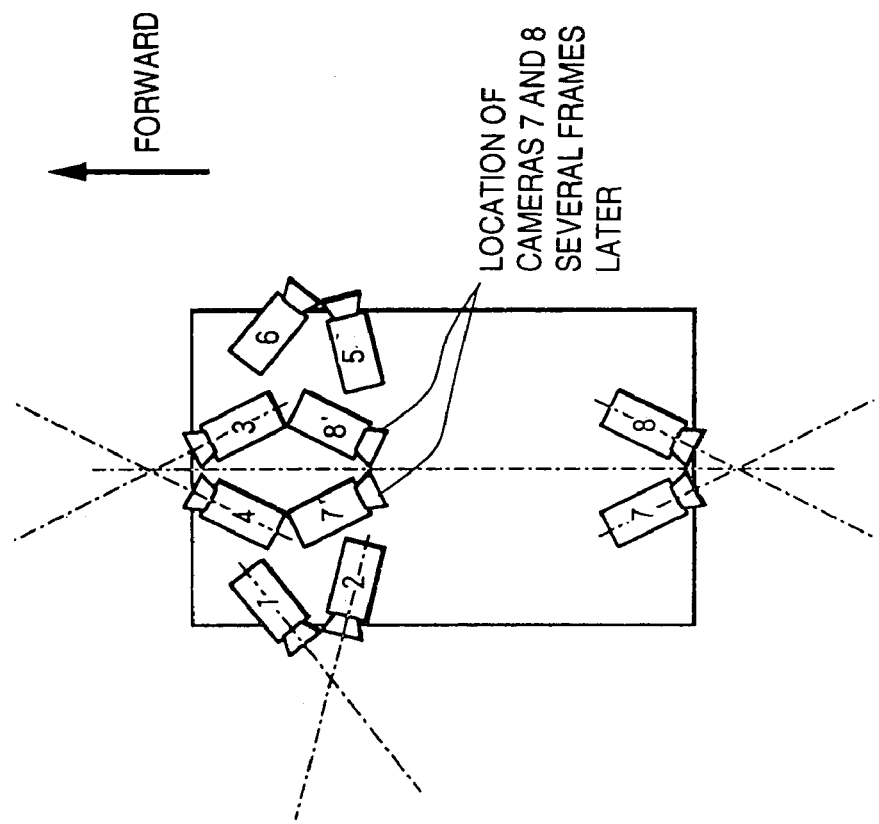
FIG. 28 is a view for explaining acquisition of image data when a vehicle travels straight in the camera layout shown in FIG. 27.

When the image acquisition system is mounted on the vehicle with the camera layout shown in FIG. 27, if this vehicle travels straight, cameras #7 and #8 respectively move to locations 7' and 8' in FIG. 28 a period r/v later. More specifically, when the vehicle keeps traveling forward, image data from both cameras #7 and #8 several frames (corresponding to the period r/v) before are used.

Figure 29:
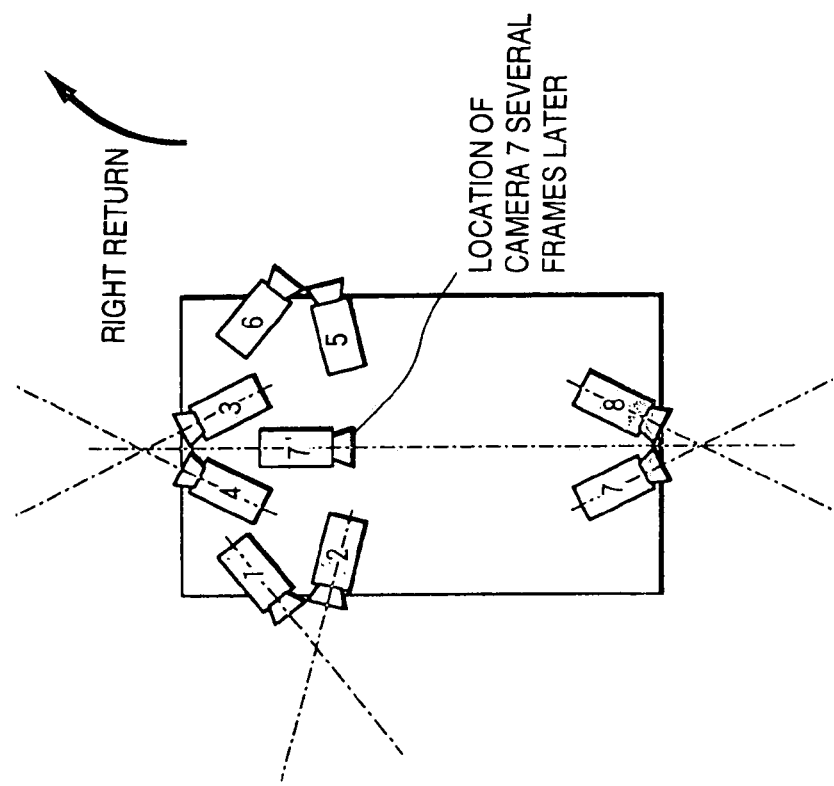
FIG. 29 is a view for explaining acquisition of image data when a vehicle turns to the left in the camera layout shown in FIG. 27.

One of the merits obtained by crossing the optical axes of cameras #7 and #8 each other appears when the vehicle turns to the right or left. More specifically, when the vehicle turns to the left, since the vehicle body rotates counterclockwise, rear camera #8 reaches a location (8') shown in FIG. 29. More specifically, assume that image data from camera #8 at the location 8' is combined with those obtained from cameras #1 to #6 at the locations before the left turn. In this case, since image data obtained from cameras #1 to #6 when the vehicle body points in a direction before the left turn (i.e., straight direction) are combined with that obtained from camera #8 in the straight direction, the problem posed by the layout shown in FIG. 8 can be solved.

Note that the left or right turn can be detected based on, e.g., the output from the posture sensor 41. That is, the computer 50 reads a file that stores the outputs from the posture sensor 41, and if the turn direction at that time indicates the right (or left), image data from camera #7 (or #8) is selected. Generally, when the vehicle body turns clockwise (counterclockwise), the output from the camera which offsets counterclockwise (clockwise) from the central line is used.

Figure 30:
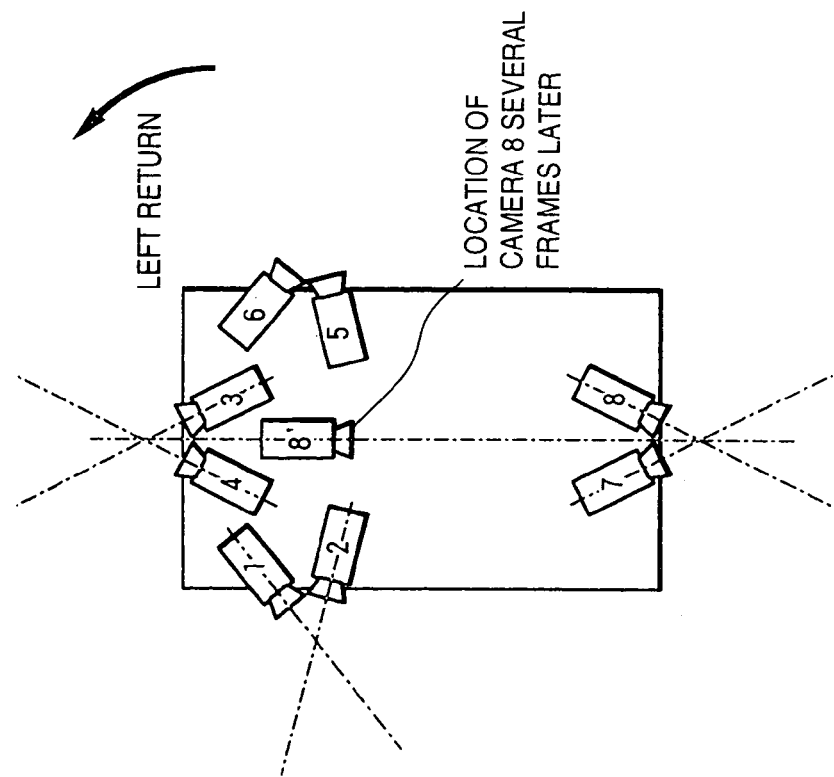
FIG. 30 is a view for explaining acquisition of image data when a vehicle turns to the right in the camera layout shown in FIG. 27.

FIG. 30 shows the case wherein image data from camera #7 is used in case of the right turn.

Note that the control sequence of the second embodiment will become apparent from that of a third modification to be described below.

<Modification of Camera Layout> . . . Third Modification

In the third modification (FIGS. 31 to 34), camera #8 that faces the rear center of the vehicle is added to the second modification.

Figure 32:
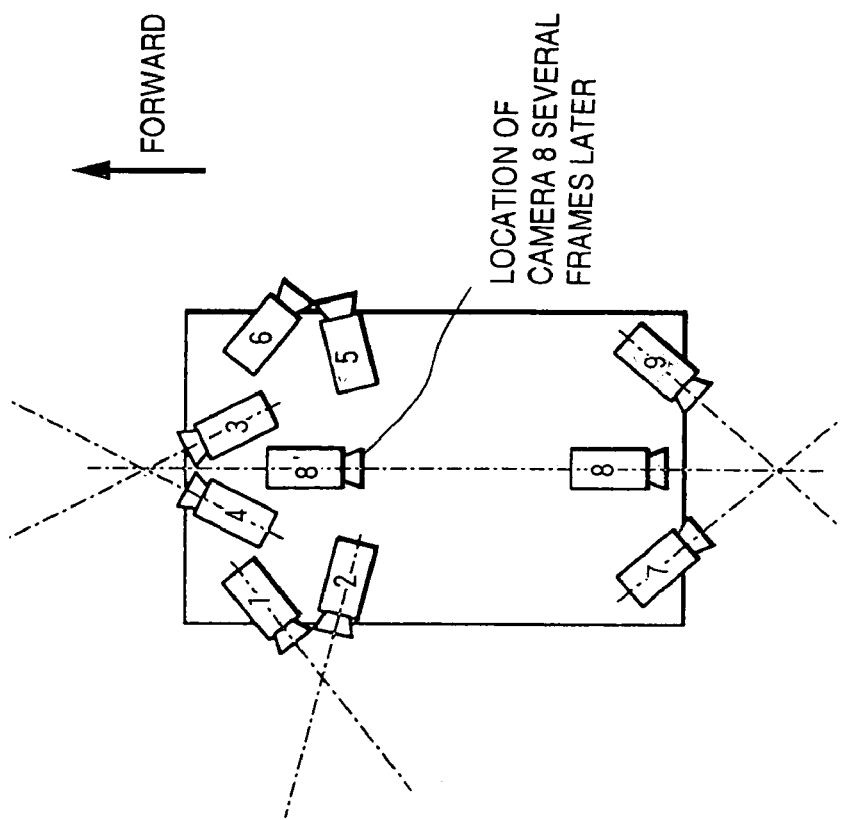
FIG. 32 is a view for explaining acquisition of image data when a vehicle travels straight in the camera layout shown in FIG. 31.
Figure 33:
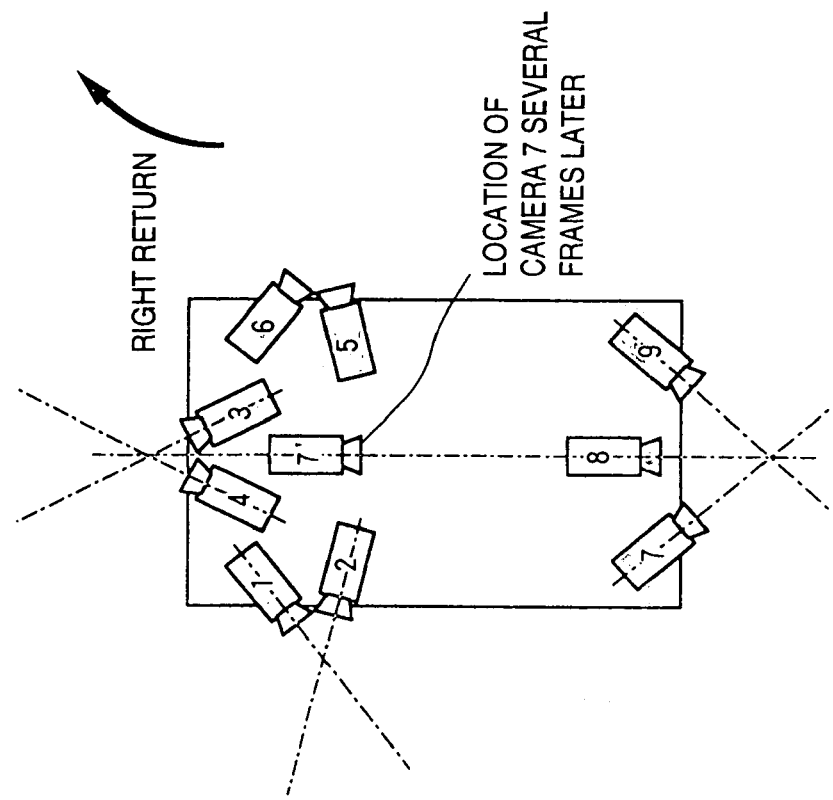
FIG. 33 is a view for explaining acquisition of image data when a vehicle turns to the left in the camera layout shown in FIG. 31.
Figure 34:
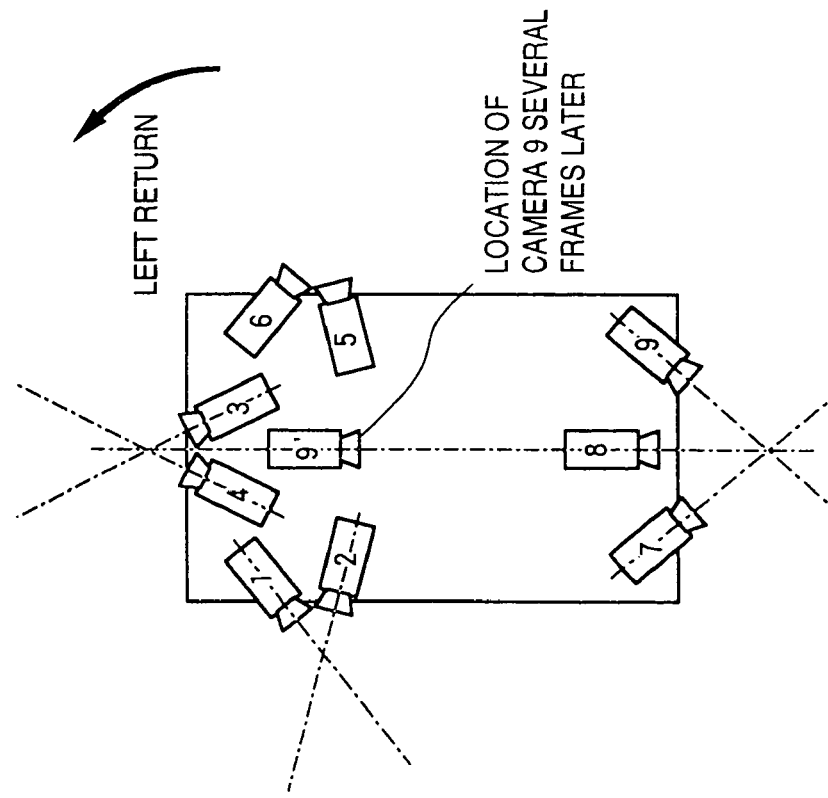
FIG. 34 is a view for explaining acquisition of image data when a vehicle turns to the right in the camera layout shown in FIG. 31.

With this layout, when the vehicle travels straight, image data from central camera #8 is used, as shown in FIG. 32; when the vehicle turns to the left, image data from camera #9 set at the right rear side is used, as shown in FIG. 33; and when the vehicle turns to the right, image data from camera #7 set at the left rear side is used, as shown in FIG. 34.

The third modification can connect images more smoothly than in the second modification.

Figure 35:
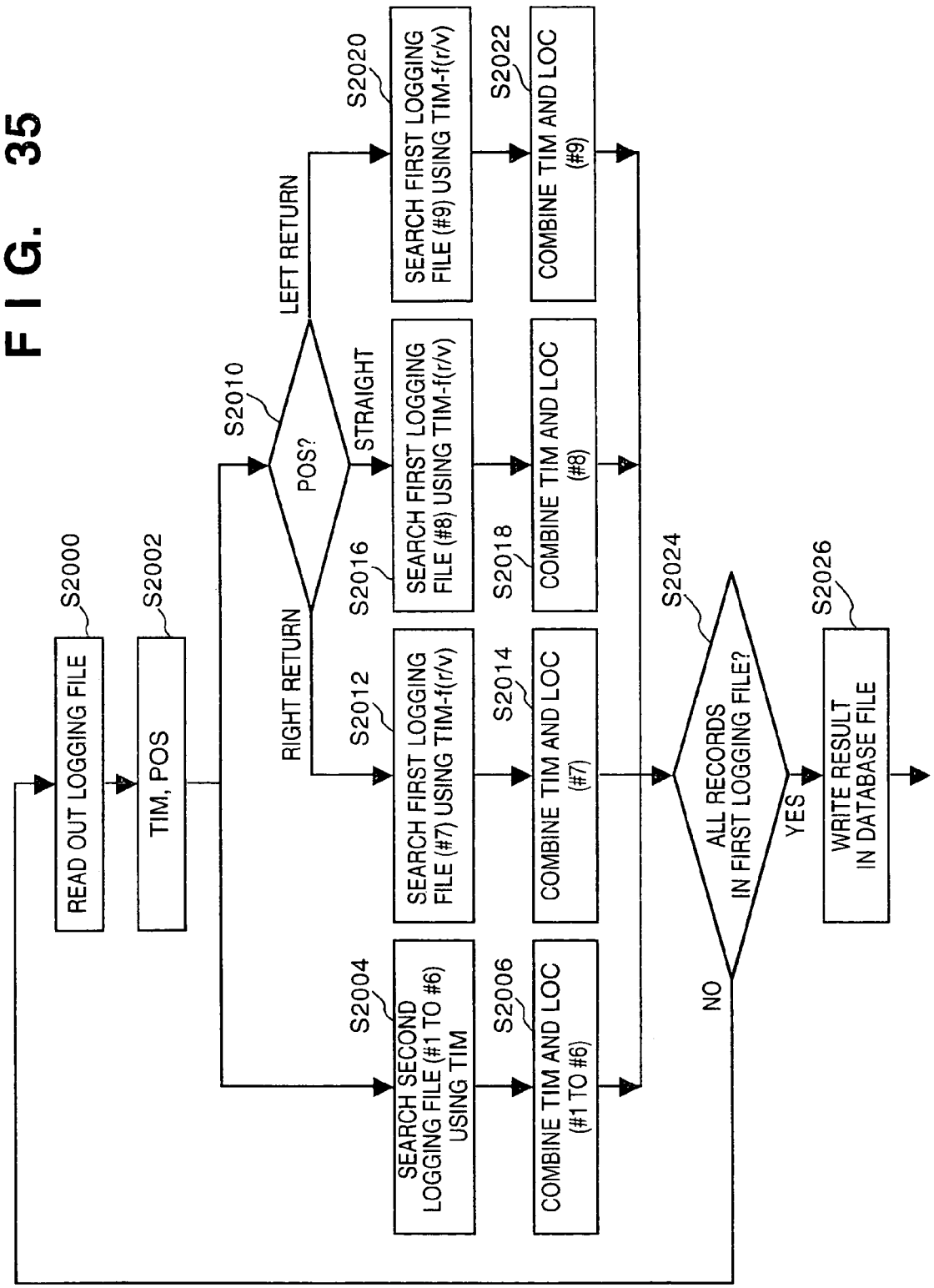
FIG. 35 is a flow chart showing the generation sequence of an image database according to a third modification.

FIG. 35 shows the database generation sequence of the third modification. This control sequence is substantially the same as that in the second modification in that one of image data from the cameras that sense rearview images is selected on the basis of the traveling direction of the vehicle (that can be determined based on the posture data POS or azimuth data from the sensor 42). The difference from the sequence shown in FIG. 21 is that the right turn, straight travel, or left turn is determined on the basis of the posture data POS (or azimuth data from the sensor 42) in step S2010, and if the right turn is determined, image data from camera #7 (FIG. 34) is used; if the straight travel is determined, image data from camera #8 (FIG. 32) is used; and if the left turn is determined, image data from camera #9 (FIG. 33) is used.

<Synchronization of Image Sensing and Database Formation> . . . Fourth Modification In the above embodiment, the image database is formed after image sensing on the basis of image data recorded on tapes in advance. However, a database may be formed while sensing images. In this case, a large-capacity, high-speed filing device is required.

Figure 31:
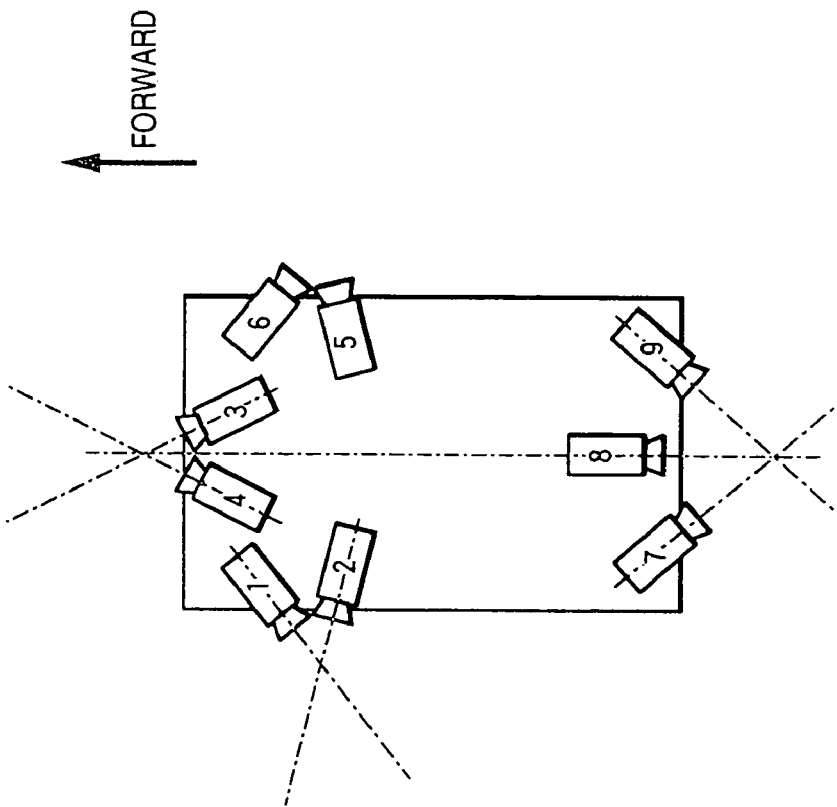
FIG. 31 is a view for explaining still another camera layout.

When a database is formed in real time in the embodiment shown in FIG. 14, 27 or 31, a buffer for delaying image data sensed by a camera set at the rear position (camera #7 in the example shown in FIG. 14; cameras #7 and #8 in the example shown in FIG. 27; cameras #7 to #9 in the example shown in FIG. 31) by the above-mentioned period f(r/v) is required.

<Other Modifications>

Figure 17:
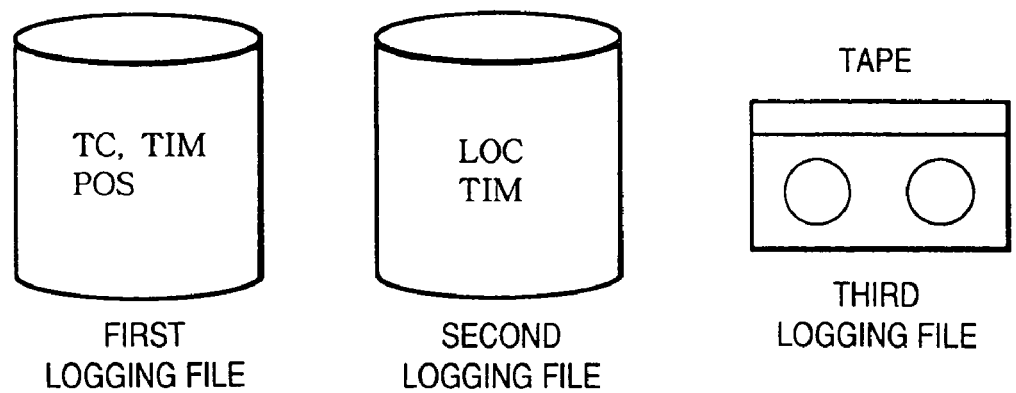
FIG. 17 shows the formats of files other than the formats shown in FIGS. 6 and 7.

In the above embodiment, as combinations of data to be stored in the first and second logging files, data TC, TIM, and POS are recorded in the first logging file, and data LOC and TIM are recorded in the second logging file, as shown in, e.g., FIG. 17. However, the present invention is not limited to such specific combinations of data shown in FIG. 17.

More specifically, since image data normally has a large capacity, image data is preferably solely recorded on a large-capacity memory such as a magnetic tape. However, data TC, TIM, POS, and LOC may be recorded in a single high-speed file.

According to the embodiment described above, location information associated with each image sensing location can be efficiently added to a sensed image sequence obtained by sensing an object using cameras.

Also, a database apparatus which builds an image database added with time information so that location information associated with each image sensing position can be efficiently added to a sensed image sequence obtained by sensing an object using cameras can be realized.

According to the above embodiment, an image database which processes sensed images from a plurality of cameras, which are separated from each other, as if they were taken by cameras which are not separated from each other can be formed. With this database, a high degree of freedom in camera layout can be assured.

Since the vehicle that mounts cameras for obtaining sensed images travels straight most of the time, the camera which senses a front image is separated from the camera which senses an image in the direction opposite to the front image while setting the cameras on the right and left sides of the vehicle to be close to each other. Hence, an image recording apparatus which can assure a high degree of freedom in camera layout can be provided.

As many apparently widely different embodiments of the present invention can be made without departing from the spirit and scope thereof, it is to be understood that the invention is not limited to the specific embodiments thereof except as defined in the appended claims.

What is claimed is:

1. An image processing method for synthesizing first image data sensed by a first image sensing means with second image data sensed by a second image sensing means to make panoramic image data, said method comprising the steps of:

retrieving image data sensed at a first time instant t1 from among a group of the first image data;

retrieving image data sensed at a second time instant t2 from among a group of the second image data, where the second time instant t2 is a time occurring after the first time instant t1 by a time period corresponding to a known distance r between the first image sensing means and the second image sensing means so that t2=t1+r/v, wherein the first image sensing means and the second image sensing means are arranged separately on a mobile object with the known distance r between them the mobile object is moving in a moving direction with a velocity v, the first image sensing means is arranged to have an image sensing direction substantially aligned with the moving direction of the mobile object, the second image sensing means is arranged to have an image sensing direction aligned with a direction opposite to the moving direction of the mobile object, and each of the first and second image data is recorded with information indicating when the image data was sensed; and synthesizing the image data retrieved at the first time instant and the second time instant to make panoramic image data of a panoramic image from a location of the first image sensing means at the first time instant.

2. The method according to claim 1, wherein each of the first and second image data is recorded with information indicating where the image was sensed.

3. An image processing apparatus for synthesizing first image data sensed by a first image sensing means with second image data sensed by second image sensing means to make panoramic image data, said apparatus comprising:

first retrieving means for retrieving the image data sensed at a first time instant t1 from among a group of the first image data;

second retrieving means for retrieving the image data sensed at a second time instant t2, from among a group of the second image data, where the second time instant t2 is a time occurring after the first time instant t1 by a time period corresponding to a known distance r between the first image sensing means and the second image sensing means so that t2= t1+r/v, wherein the first image sensing means and the second image sensing means are arranged separately on a mobile object with the known distance r between them, the mobile object is moving in a moving direction with a velocity v, the first image sensing means is arranged to have an image sensing direction substantially aligned with the moving direction of the mobile object, the second image sensing means is arranged to have an image sensing direction aligned with a direction opposite to the moving direction of the mobile object, and each of the first and second image data is recorded with information indicating when the image data was sensed; and synthesizing means for synthesizing the two retrieved image data to make panoramic image data of a panoramic image from a location of the first image sensing means at the first time instant.

* * * * *